US011722874B2

(12) United States Patent
Choi et al.

(10) Patent No.: US 11,722,874 B2
(45) Date of Patent: Aug. 8, 2023

(54) TIMING DETERMINATION FOR SIGNALS IN SIDELINK POSITIONING

(71) Applicant: QUALCOMM Incorporated, San Diego, CA (US)

(72) Inventors: Chang-Sik Choi, Hillsborough, NJ (US); Dan Vassilovski, Del Mar, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/160,135

(22) Filed: Jan. 27, 2021

(65) Prior Publication Data

US 2022/0240074 A1 Jul. 28, 2022

(51) Int. Cl.
*H04W 48/14* (2009.01)
*H04W 8/00* (2009.01)
(Continued)

(52) U.S. Cl.
CPC ............ *H04W 8/005* (2013.01); *H04W 4/06* (2013.01); *H04W 4/40* (2018.02); *H04W 92/18* (2013.01)

(58) Field of Classification Search
CPC ......... H04W 8/005; H04W 4/06; H04W 4/40; H04W 92/18; H04W 4/02; H04W 64/00;
(Continued)

(56) References Cited

U.S. PATENT DOCUMENTS

2018/0220263 A1* 8/2018 Jiang .................... G01S 13/825
2019/0239181 A1* 8/2019 Gangakhedkar ...... H04W 76/10
(Continued)

FOREIGN PATENT DOCUMENTS

CN 111796260 A 10/2020

OTHER PUBLICATIONS

Intel Corporation: "Analysis of Anchored and Non-Anchored D2D Aided Positioning", 3GPP TSG RAN WG1 Meeting #82, 3GPP Draft, R1-153991 Intel-13 D2D Trilateration, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), pp. 1-6, XP051001398, Retrieved from the Internet: URL: http://www.3gpp.org/ftp/Meetings_3GPP_SYNC/RAN1/Docs/ [Retrieved on Aug. 23, 2015] The Whole Document, p. 1-p. 4.

(Continued)

*Primary Examiner* — Tanmay K Shah
(74) *Attorney, Agent, or Firm* — Thien T. Nguyen

(57) ABSTRACT

A ranging session between multiple user equipments (UEs) is initiated using an initial message that includes identifiers (IDs) for the initiating UE and each of one or more responder UEs. Each UE in the ranging session independently determines the timing instances of the signaling for each UE in the ranging session based on the UE IDs in the initial message. Signaling information, such as identifiers for the ranging signals, may likewise be independent determined by each UE based on the UE IDs. The order of UE IDs and number of responder UEs provided in the initial message may also be used to determine the timing instances of signaling and signaling information. The UEs, for example, may use a common multivariable deterministic function with the UE IDs as inputs to each separately derive the timing instance for itself and the other UEs in the ranging session.

42 Claims, 7 Drawing Sheets

(51) Int. Cl.
*H04W 4/06* (2009.01)
*H04W 4/40* (2018.01)
*H04W 92/18* (2009.01)

(58) Field of Classification Search
CPC ........... G01S 5/0289; G01S 2013/9316; G01S 13/765
USPC .......................................................... 455/434
See application file for complete search history.

(56) References Cited

U.S. PATENT DOCUMENTS

2021/0076163 A1* 3/2021 Burowski ............... H04W 4/08
2021/0136556 A1* 5/2021 Lee .......................... H04L 1/08

OTHER PUBLICATIONS

International Search Report and Written Opinion—PCT/US2021/061023—ISA/EPO—dated Mar. 18, 2022.
Qualcomm Incorporated: "On Unlicensed Positioning and Applicable Use Cases", 3GPP Draft, 3GPP RAN #86, RP-192527, 3RD Generation Partnership Project (3GPP), Mobile Competence Centre, 650, Route Des Lucioles, F-06921 Sophia-Antipolis Cedex France, No. Sitges, Spain, Dec. 9, 2019-Dec. 12, 2019 Dec. 2, 2019 (Dec. 2, 2019), XP051834167, 12 Pages, Retrieved from the Internet: URL:https://ftp.3gpp.org/tsg_ran/TSG_RAN/TSG R_86/Docs/RP-192527.zip RP-192527 On Unlicensed Positioning and Applicable Use Cases.pdf [retrieved on Dec. 2, 2019] the whole document, p. 11.

* cited by examiner

TIMING DETERMINATION FOR SIGNALS IN SIDELINK POSITIONING

BACKGROUND

Background Field

The subject matter disclosed herein relates to wireless communications systems, and more particularly to methods and apparatuses for range determination of user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a signal from a first device to receiving an acknowledgement from a second device (minus processing delays) corresponds to the distance (range) between the two devices.

During a ranging session multiple messages are exchanged between participating UEs. The timing of the various messages should be controlled, e.g., to avoid interference. Where multiple nearby UEs are participating in the ranging session, the overhead for messages that control the timing for the message exchange may become excessively large.

SUMMARY

A ranging session between multiple user equipments (UEs) is initiated using an initial message that includes identifiers (IDs) for the initiating UE and each of one or more responder UEs. Each UE in the ranging session independently determines the timing instances of the signaling for each UE in the ranging session based on the UE IDs in the initial message. Signaling information, such as identifiers for the ranging signals, may likewise be independent determined by each UE based on the UE IDs. The order of UE IDs and number of responder UEs provided in the initial message may also be used to determine the timing instances of signaling and signaling information. The UEs, for example, may use a common multivariable deterministic function with the UE IDs as inputs to each separately derive the timing instance for itself and the other UEs in the ranging session.

In one implementation, a method of ranging between user equipments (UEs) performed by an initiating UE, includes sending an initial message to one or more responder UEs to initiate a ranging session, the initial message comprising an identifier (ID) for the initiating UE and an ID for each of the one or more responder UEs; determining timing instances for messages in the ranging session from the initiating UE and each of the one or more responder UEs based on the ID for the initiating UE and the ID for each of the one or more responder UEs; and performing the ranging session with each of the one or more responder UEs using the determined timing instances for the messages in the ranging session.

In one implementation, a user equipment (UE) configured to perform a ranging session between UEs, the UE being an initiating UE in the ranging session, the UE includes a wireless transceiver configured to wirelessly communicate with entities in a wireless network; at least one memory; and at least one processor coupled to the wireless transceiver and the at least one memory, wherein the at least one processor is configured to: send an initial message to one or more responder UEs to initiate a ranging session, the initial message comprising an identifier (ID) for the initiating UE and an ID for each of the one or more responder UEs; determine timing instances for messages in the ranging session from the initiating UE and each of the one or more responder UEs based on the ID for the initiating UE and the ID for each of the one or more responder UEs; and perform the ranging session with each of the one or more responder UEs using the determined timing instances for the messages in the ranging session.

In one implementation, a user equipment (UE) configured to perform ranging between UEs, the UE being an initiating UE in the ranging session, the UE includes means for sending an initial message to one or more responder UEs to initiate a ranging session, the initial message comprising an identifier (ID) for the initiating UE and an ID for each of the one or more responder UEs; means for determining timing instances for messages in the ranging session from the initiating UE and each of the one or more responder UEs based on the ID for the initiating UE and the ID for each of the one or more responder UEs; and means for performing the ranging session with each of the one or more responder UEs using the determined timing instances for the messages in the ranging session.

In one implementation, a non-transitory storage medium including program code stored thereon, the program code is operable to configure at least one processor in a user equipment (UE) to perform ranging between UEs, the UE being an initiating UE in the ranging session, the non-transitory storage medium includes program code to send an initial message to one or more responder UEs to initiate a ranging session, the initial message comprising an identifier (ID) for the initiating UE and an ID for each of the one or more responder UEs; program code to determine timing instances for messages in the ranging session from the initiating UE and each of the one or more responder UEs based on the ID for the initiating UE and the ID for each of the one or more responder UEs; and program code to perform the ranging session with each of the one or more responder UEs using the determined timing instances for the messages in the ranging session.

In one implementation, a method of ranging between user equipments (UEs) performed by a responder UE, the method includes receiving an initial message from an initiating UE to initiate a ranging session, the initial message comprising an identifier (ID) for the initiating UE and an ID for each of one or more responder UEs; determining timing instances for messages in the ranging session from the initiating UE and each of the one or more responder UEs based on the ID for the initiating UE and the ID for each of the one or more responder UEs; and performing the ranging session with the initiating UE using the determined timing instances for the messages in the ranging session.

In one implementation, a user equipment (UE) configured to perform a ranging session between UEs, the UE being a responder UE in the ranging session, the UE includes a wireless transceiver configured to wirelessly communicate with entities in a wireless network; at least one memory; and at least one processor coupled to the wireless transceiver and the at least one memory, wherein the at least one processor is configured to: receive an initial message from an initiating UE to initiate a ranging session, the initial message comprising an identifier (ID) for the initiating UE and an ID for each of one or more responder UEs; determine timing instances for messages in the ranging session from the initiating UE and each of the one or more responder UEs based on the ID for the initiating UE and the ID for each of the one or more responder UEs; and perform the ranging session with the initiating UE using the determined timing instances for the messages in the ranging session.

In one implementation, user equipment (UE) configured to perform a ranging session between UEs, the UE being a responder UE in the ranging session, the UE includes means for receiving an initial message from an initiating UE to initiate a ranging session, the initial message comprising an identifier (ID) for the initiating UE and an ID for each of one or more responder UEs; means for determining timing instances for messages in the ranging session from the initiating UE and each of the one or more responder UEs based on the ID for the initiating UE and the ID for each of the one or more responder UEs; and means for performing the ranging session with the initiating UE using the determined timing instances for the messages in the ranging session.

In one implementation, a non-transitory storage medium including program code stored thereon, the program code is operable to configure at least one processor in a user equipment (UE) to perform a ranging session between UEs, the UE being a responder UE in the ranging session, the non-transitory storage medium includes program code to receive an initial message from an initiating UE to initiate a ranging session, the initial message comprising an identifier (ID) for the initiating UE and an ID for each of one or more responder UEs; program code to determine timing instances for messages in the ranging session from the initiating UE and each of the one or more responder UEs based on the ID for the initiating UE and the ID for each of the one or more responder UEs; and program code to perform the ranging session with the initiating UE using the determined timing instances for the messages in the ranging session.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
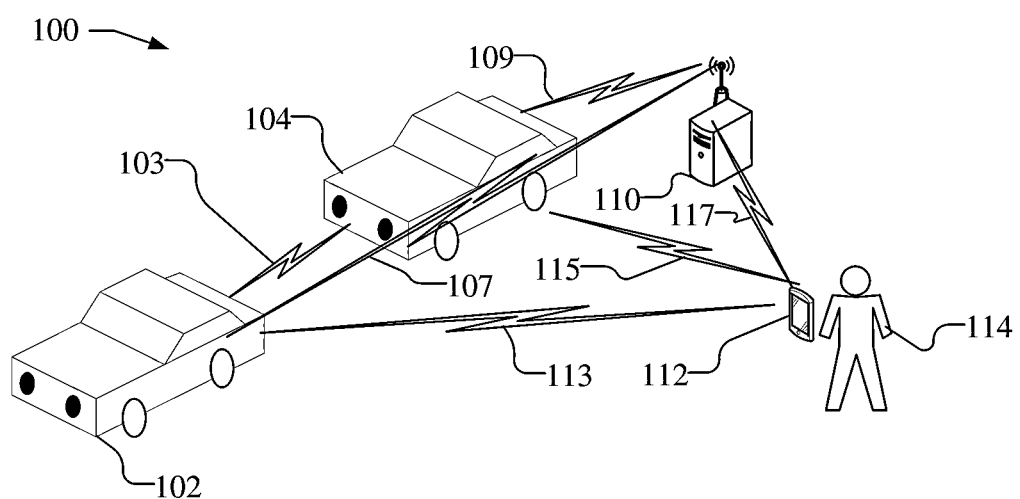
FIG. 1 illustrates a wireless communication system illustrating distributed UE communications, including ranging signaling.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messaged and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OT-DOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each pair UE to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum).

A ranging session may include one initiating UE and one or more responder UEs. To initiate a ranging session, without the assistance of a gNB or base station in a wireless network, the initiating UE broadcasts a pre-PRS message that is received by one or more responder UEs. Conventionally, the pre-PRS message broadcast by the initiating PRS includes information necessary to engage in the ranging session, including identification, signaling, and timing information for the various messages. By way of example, the pre-PRS message that is broadcast by the initiating UE conventionally includes identification information such as the Layer 2 (L2) identifier for the initiating UE, sometimes referred to herein as UE ID and a set of UE IDs of other UEs with which the initiating UE chooses to range. The pre-PRS message further includes signaling information, such as the order of PRS broadcast for the UEs, the PRS bandwidth or channel, the PRS sequence ID (i.e., PRS ID) for the initiating UE, and the PRS ID for the other UEs. The pre-PRS message further includes timing indications for the various messages including, the pre-PRS, the PRS, and the post-PRS for all responder UEs.

As can be seen, the pre-PRS message may have a relatively large overhead. Moreover, when several responder UEs are included in the ranging session, the pre-PRS message broadcast by the initiating UE may significantly increase in size. If multiple ranging or positioning sessions are initiated separately, there is a likelihood of collision of the relatively large pre-PRS messages. Thus, it is desirable to reduce the size of the pre-PRS message sent by the initiating UE to initiate a ranging session.

Accordingly, in an implementation, as discussed herein, the initiating UE may send an initial pre-PRS message to one or more responder UEs that includes IDs for the initiating UE and responder UE(s). Each UE may use the IDs for the initiating and responding UEs as inputs to determine the timing instances for the remaining messages in the ranging session, e.g., the timing instances of the pre-PRS messages for each of the responder UEs, the timing instance(s) of the broadcast of the PRS (estimated if on an unlicensed spectrum), and the timing instances of the post-PRS messages. For example, each UE may use a multivariable deterministic function that uses the vector of IDs for the initiating and responding UEs, as well as the order of the IDs, as inputs to determine the timing instances for the remaining messages in the ranging session. Each UE uses the multivariable deterministic function and the ID inputs to derive the timing instance for itself and the other UEs uniquely. The UEs may further determining signaling information, such as the PRS sequence IDs, using the multivariable deterministic function and ID inputs. Thus, the initial pre-PRS message sent by the initiating UE need not include timing indications, and in some implementations, some signaling information, for various messages in the ranging session, thereby reducing the size of the pre-PRS message payload.

FIG. 1 illustrates a wireless communication system 100 illustrating distributed communications including ranging signaling using a deterministic function to determine timing instances of messaging during the ranging and/or positioning session, as described herein. Wireless communication system 100 illustrates a first vehicle 102 with a first wireless device, e.g., V-UE 102, in wireless communications with another V-UE 104, illustrated as a second vehicle. The V-UE 102 and V-UE104 may comprise, but are not limited to, an on board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first vehicle 102 and second vehicle 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities when the V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the vehicle 102 and vehicle 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, vehicle 102 and vehicle 104 may directly communicate using with a Vehicle-to-Vehicle (V2V) communication link 103. Vehicle 102 and vehicle 104 may similarly directly communicate with roadside unit (RSU) 110 via Vehicle-to-Infrastructure (V2I) communication links 107 and 109, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The vehicles 102, 104 and RSU 110 may communicate with additional entities, such as additional vehicles, RSUs or with a UE 112 held by pedestrian 114 using direct communication links. For example, vehicle 102 may communicate with UE 112 via V2V communication link 113, vehicle 104 may communicate with UE 112 via V2V communication link 115, and RSU 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, vehicle 102 and vehicle 104 may indirectly communicate with each other, e.g., through the RSU 110 via the V2I communication links 107 and 109, respectively or through other network infrastructure (not shown), e.g., e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

Vehicles 102 and 104, as well as RSU 110 and UE 112, may engage in ranging/positioning sessions, including sending and receiving pre-PRS messages, broadcasting PRS, and sending post-PRS messages on links 103, 107, 109, 113, 115, or 117 with which the range or relative positions between the entities may be determined. By way of example, the PRS broadcast by vehicles 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcasting on unlicensed spectrum, listen before transmit (LBT) protocols may be employed.

Where vehicles 102 and 104 broadcast PRS in a V2V link 103, the range or relative positions between vehicles 102 and 104 may be determined directly, e.g., using one way ranging. Where vehicles 102 and 104 broadcast PRS in V2I links 107 and 109 or via links 113 and 115, the range or relative positions between vehicle 102 and RSU 110 or UE 112 and between vehicle 104 and RSU 110 or UE 112 may be determined directly using one way ranging.

The direct wireless communications between the vehicles 102 and 104 and RSU 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
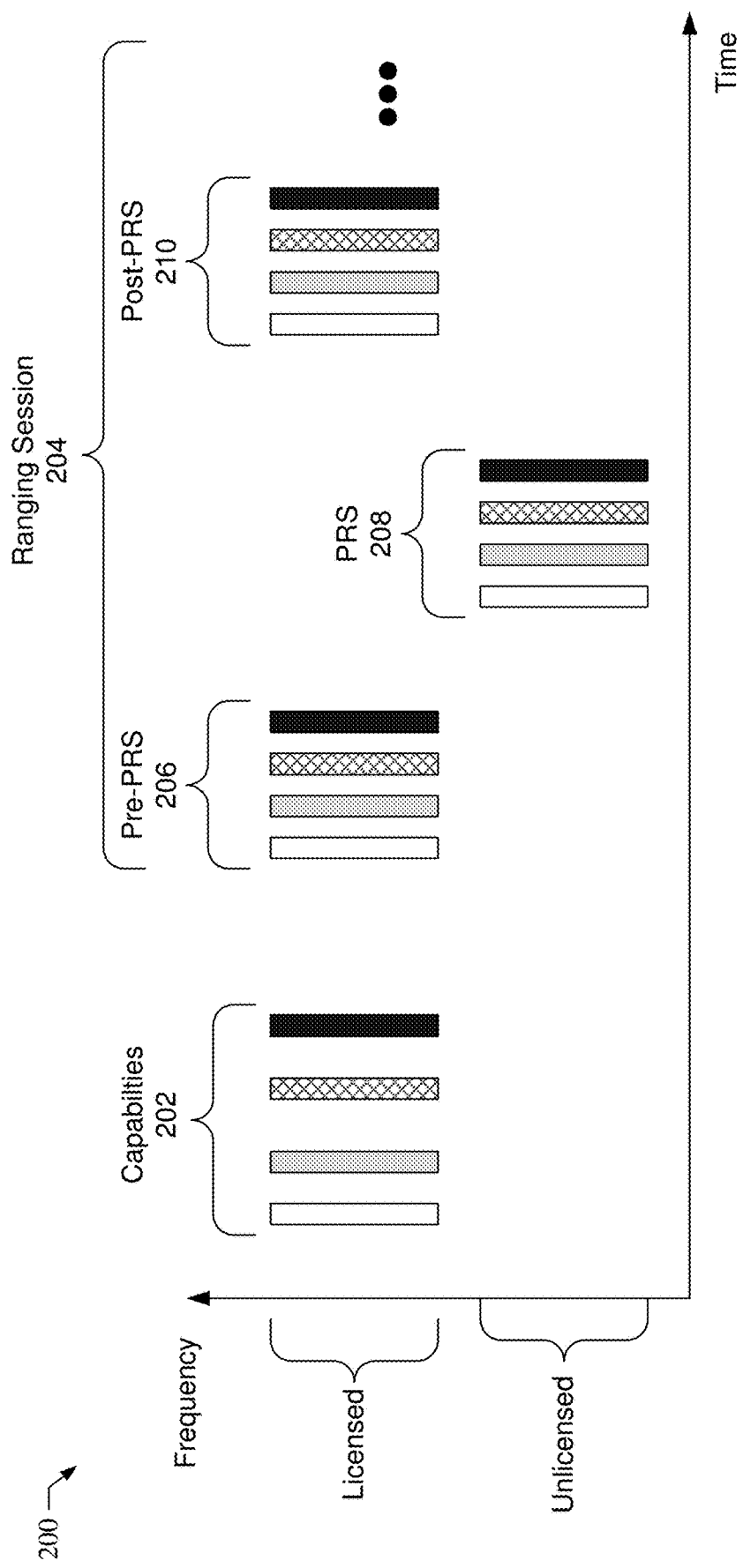
FIG. 2 illustrates a signaling graph indicating the timing and frequencies of various messages that may be sent and received by an initiating UE and three responder UEs for a ranging or positioning session.

FIG. 2 illustrates, by way of example, a signaling graph 200 indicating the timing and frequencies of various messages that may be sent and received by an initiating UE and three responder UEs for a ranging or positioning session. For example, FIG. 2 illustrates an RTT-based ranging session 204, during which a number of messages are sent between an initiating UE and responder UEs, including pre-PRS messages 206 to request and accept a ranging session, the PRS signals 208 for measurement, and post-PRS messages 210 to exchange measurement payloads. In FIG. 2, the signaling from the initiating UE is illustrated with white boxes, signaling from a first responder UE is illustrated with grey boxes, signaling from a second responder UE is illustrated with hatched boxes, and signaling from a third responder UE is illustrated with black boxes.

As illustrated, the UEs, including the initiating UE and responder UEs, may broadcast capabilities messages 202. The capabilities messages are not part of the ranging session but may include information that may be used by the initiating UE to initiate a ranging session with selected UEs. For example, the capabilities message may include the UE ID (e.g., the L2 ID), the ranging capability of the UE, the channel that the UE is configured to use, etc. It should be understood that while FIG. 2 illustrates the capabilities messages 202 as having the same order as the messages in the ranging session 204, the order may, in fact, differ.

The pre-PRS messages 206 (e.g., pre-ranging messages) are used by the UEs to request and accept a ranging session. As illustrated, the pre-PRS messages 206 may be transmitted on a licensed spectrum to guarantee reliability. The pre-PRS messages 206 may be broadcast or unicast with Radio Resource Control (RRC) connections. The initiating UE broadcasts an initial pre-PRS message 206 (illustrated by the white box) to indicate the ranging session between the initiating UE and the responder UEs and which may provide information for the ranging session. For example, the pre-PRS message 206 from the initiating UE, may include IDs for participating UEs, i.e., the initiating and responder IDs. The pre-PRS message may include the PRS ID that will be used by the initiating UE, and in some implementations, the PRS ID to be used by the responder UEs. If the PRS ID will be fixed over multiple PRS exchanges (e.g., for multiple units in the ranging session 204), the initiating UE may include an ID associated with the current PRS exchange, e.g., a session ID. The initiating UE may determine when the PRS signals 208 will be transmitted, which, for example, may be configured from an upper layer in the initiating UE. The initiating UE may indicate the timing of the PRS by sending the time slot number nears to the desired PRS transmission time. In some implementations, the time slot may be subject to local clock error. In some implementations, the initiating UE may further provide the timing of PRS to be sent by the responder UEs. The initiating UE may further indicate the frequency that will be used to broadcast the PRS signal 208 by the initiating UE. For example, the frequency of PRS may be selected from an available set of total bandwidths or the frequency of PRS may be selected by sensing the interference and choosing one or more channels whose average interference Reference Signal Receive Power (RSRP) is less than a threshold. The initiating UE may indicate the number of PRS cycles that it will execute during the ranging session 204. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS message from the initiating UE is received and decoded by the responder UEs, which are identified in the initial pre-PRS message. The responder UEs may send responding pre-PRS messages 206 (illustrated with grey, hatched, and black boxes) acknowledging the initial pre-PRS message, which may additionally provide information for the ranging session. For example, each responder UE may determine the timing of its PRS signal 208, e.g., based on the PRS timing of the initiating UE plus a delay, which may be based on hardware constraints and the interference level, and the number and order of responder UEs. For example, the delay may be relatively low when the PRS processing time is small and ambient interference is low and may be relatively high when the PRS processing time is high and ambient interference is high. The responder UE may indicate the determined time of its PRS by sending the time slot number nears to the determined PRS transmission time. In some implementations, the time slot may be subject to local clock error. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 204), the responder UE may include the ID associated with the current PRS exchange, e.g., a session ID, that was received in the initial pre-PRS message from the initiating UE. Each responder UE may further indicate the frequency that will be used to broadcast its PRS signal 208. The responder UEs may broadcast the pre-PRS messages 206, which may be received by the initiating UE (and other responder UEs). In some implementations, each responder UE may transmit the pre-PRS message 206 using unicast with RRC connection.

The PRS signals 208 are exchanged by the participating UEs. The initiating UE and responder UEs know the expected timing of the PRS signals and know the PRS ID (and any session ID used with the exchanged) as well as the frequency that is used to broadcast the PRS signals 208. The PRS signals 208 may be broadcast on an unlicensed spectrum, which may be subject to LBT constraints. For example, the initiating UE broadcasts its PRS signal 208 (shown with the white box) at the determined time that was indicated in the initial pre-PRS message 206. In some implementations, the initiating UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiating UE uses the PRS signal that corresponds to the PRS ID and uses the frequency resources that were indicated in its initial pre-PRS message 206. The initiating UE saves the time instance that the PRS signal is broadcast, and the responder UEs save the time instance that the PRS signal is received. In some implementations, the time instances may be subject to local clock error.

Similar to the initiating UE, each responder UEs broadcast its PRS signal 208 (shown with the grey, hatched, and black boxes) at the determined time that was indicated in the initial pre-PRS message 206. at the determined time that it indicated in the pre-PRS message 206 (or that was assigned by the initial UE). In some implementations, each responder UE may broadcast its PRS signal at the determined time plus a random waiting time due to the LBT constraints when the PRS signal is deployed in the unlicensed spectrum. In some implementations, the LBT may be a Category 2 LBT with a fixed window CCA or a Category 4 LBT with a varying window CCA. Each responder UE uses the PRS signal that corresponds to the PRS ID and uses the frequency resources that were indicated in its pre-PRS message 206. Each responder UE saves the time instance that its PRS signal is broadcast, and the initiating UE (and optionally other responder UEs) save the time instance that the PRS signal is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X. The PRS signal, for example, is a pseudo-noise (PN) sequence. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNII radio bands including, for example, one or more of the UNII-1 radio band, the UNII-2A radio band, the UNII-2B radio band, or the UNII-3 radio band.

The post-PRS messages 210 are sent by each UE to exchange measurement payloads. As illustrated, the post-PRS messages 210 may be transmitted on a licensed spectrum to guarantee reliability. In some implementations, the post-PRS messages 210 may be broadcast or unicast with RRC connection. The initiating UE sends its post-PRS message 210 (shown with the white box) and indicates when it broadcast the PRS signal 208 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiating UE and the responder UEs. In some implementations, the initiating UE may provide an indication of its location in the post-PRS message 210, if known. For example, the location of the initiating UE may be the location at a specific time, such as the broadcast time of its PRS signal or the arrival time of the PRS signal from a responder UE.

Similar to the initiating UE, each responder UEs sends its post-PRS signal 210 (shown with the grey, hatched, and black boxes) to provide the measurement payloads. Each responder UE may indicate whether it received the PRS signal from the initiating UE and may indicate when it broadcast the PRS signal 208 (ToD) and when the PRS signals from the initial UE (and optionally from other responder UEs) was received (ToA). In some implementations, the ToD may be computed as a relative time with respect to the ToA of the PRS signal from the initiating UE (and optionally with respect to the ToA of the PRS from other responder UEs). In some implementations, the relative time may be approximated to the closest multiple of time scale shared by the initiating UE and the responder UE. In some implementations, the responder UE may provide an indication of its location in the post-PRS message 210, if known. For example, the location of the responder UE provided may be the location at a specific time, such as the arrival time of PRS signal from the initiating UE or the departure time of its broadcast PRS signal.

After receiving the post-PRS messages, the initiating UE may compute its range (and in some implementations its location), e.g., using a Kalman filter, and then may transmit the next cycle of pre-PRS messages at a time that is indicated by an upper layer or that is autonomously determined by the initiating UE.

The time between the first pre-PRS message 206 and the last post-PRS message 210 may be the duration of the ranging session and may be, e.g., 100 msec. In some implementations, multiple instances of pre-PRS messages 206, PRS 208, and post-PRS messages 210, may be used in a single ranging session 204 to provide higher accuracy.

Both the initiating UE and the responder UEs may determine the range between itself and each other UE in the ranging session based on the ToD and the ToA of the broadcast PRS signals. For example, the RTT between any pair of UEs (which may be any pair of initiating and responder UEs) may be determined based on the $ToD_i$ and $ToA_i$ for the $PRS_i$ signals (where i=1 for PRS broadcast from a first UE and i=2 for PRS broadcast by a second UE), as the difference between the $ToD_1$ and $ToA_2$ minus the difference between the $ToA_1$ and the $ToD_2$, e.g., as follows.

$$RTT = (ToD_1 - ToA_2) - (ToA_1 - ToD_2) \qquad \text{eq. 1}$$

The RTT value is the round trip time for the signal, and thus, the range (distance) between the $UE_1$ and $UE_2$ may be determined as RTT/2c, where c is the speed of light.

If the position of one or more UEs is known, the range between the initiating UE and receiving UE may be used, along with a known position of one of the UE's to determine the position of the other UE, and thus, the ranging session may be a positioning session. The positions of UEs may be provided to other UEs through messaging, e.g., in the pre-PRS messages or in the post-PRS messages. If the positions of multiple UE's are known, multilateration may be used to determine the position of remaining UEs. The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 206 or post-PRS messages 210), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based UE to positions accessible to a vehicle, such as a road.

As discussed above, the initiating UE broadcasts a pre-PRS message that conventionally includes a relatively large payload size including identification, signaling, and timing information to be used for the various messages in the ranging session. When there are multiple responder UEs included in the ranging session, the payload size of the pre-PRS message may significantly increase overhead and the likelihood of collisions with messages in other concurrent ranging sessions.

To reduce the size of the pre-PRS message 206 sent by the initiating UE, each UE in the ranging session may separately determine the timing instances for the signaling in the ranging session based on a vector of UE IDs for the initiating UE and responder UEs provided in the pre-PRS message from the initiating UE. In some implementations, additional information, such as PRS identifiers or other signaling information, may be separately determined by each UE based on the vector of UE IDs provided in the pre-PRS message. If each UE separately determines the timing instances for signaling (and signaling information), the initial pre-PRS message 206 does not explicitly include this information, thereby significantly reducing the size of the pre-PRS message 206 sent by the initiating UE.

For example, a multivariable deterministic function may be shared and used by each UE in order to reduce the payload size of the pre-PRS message from the initiating UE. The multivariable deterministic function, for example, may use the vector of UE IDs provided by the initiating UE in the pre-PRS message 206 to generate unique timing instances of the signaling in the ranging session. The initiating UE may obtain the UE IDs, for example, from the capabilities messages 202 sent by each responder UE. The capabilities messages 202 may further include an indication of the responder UE's timing determination capability (e.g., whether the UE is capable of using a multivariable deterministic function to determining timing of messages in a ranging session). In some implementations, the order of UE IDs in the vector of UE IDs may contribute to the generation of the unique timing instances. The multivariable deterministic function, for example, may be a hash function or other type of function that maps the set of input data (e.g., vector of UE IDs) to timing information for all support messages in the ranging session. Any desired multivariable deterministic function may be used, as may be generated by one of ordinary skill, but should provide a one-to-one mapping of the output (invertible) per set of input. The multivariable deterministic function may be invertible so that it uniquely produces a set of outputs from the set of inputs in a reproducible fashion (e.g., (1,2,3)=f(4,5,6); (1,2,4)=f(4,5,8)), and the input values may be uniquely inferred from the output values, e.g., the mapping may be reversed. The input and outputs may be vectors and the function f may operate as an invertible function in vector space.

By way of example, the multivariable deterministic function, using the vector of UE IDs as an input, may be written as:

$$F(a, b, c, d, e, f, \ldots) = (x, y, z, w, v, \ldots) \qquad \text{eq. 2}$$

where (a, b, c, d, e, f, . . . ) is the inputs to the multivariable deterministic function F (such as vector of UE IDs including the initiating UE ID and responder UE IDs as provided in the pre-PRS message from the initiating UE), and (x, y, z, w, v, . . . ) are the outputs of the multivariable deterministic function F (such as the timing instances for the remaining signaling in the ranging session and signaling information, such as the PRS IDs).

Figure 3:
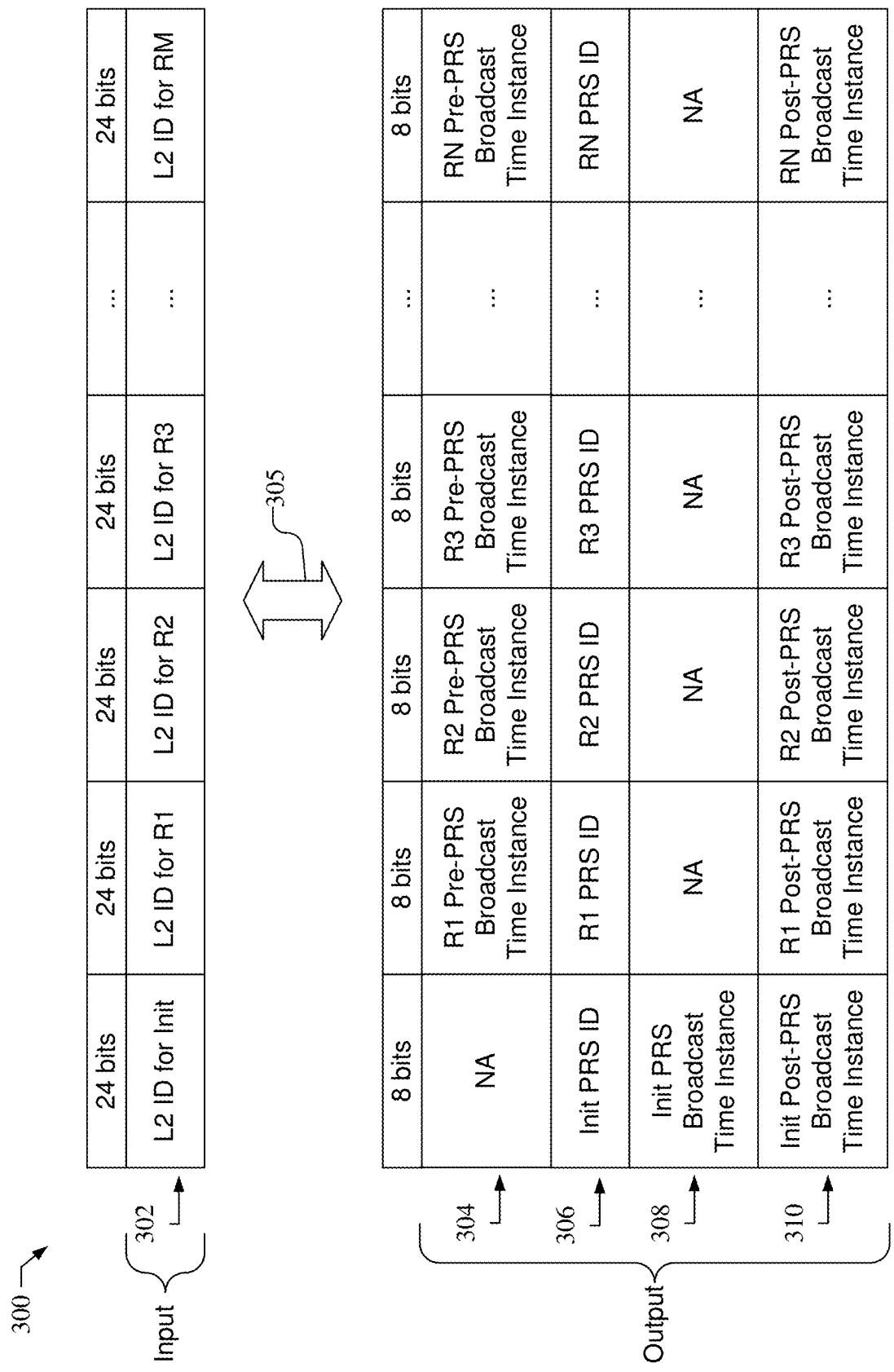
FIG. 3 illustrates an example of a multivariable deterministic function that may be used.

FIG. 3 illustrates an example of a multivariable deterministic function F that may be used. The input to the multivariable deterministic function F, for example, may be provided as a vector of UE IDs 302, e.g., including the L2 ID of the initiator UE (24 bits), the number M of responder UEs (which is implicit in the vector of IDs), the L2 IDs of responder UEs R1-RM (24*M bits where M is the number of responder UEs), and the specific ordering of the responder UEs (which is implicit in the vector of IDs).

As illustrated by arrow 305, the multivariable deterministic function F maps the input into an output of the multivariable deterministic function F, for example, may include the broadcast time instances 304 for the pre-PRS messages 206 including the pre-PRS message 206 broadcast timing for each responder UEs (integer for the slot number), the PRS ID 306 for the PRS signals 208 (integer for the PRS ID for initiator and responder UEs), the broadcast timing 308 of the PRS signal 208 for the initiator UE (integer for the slot number—which may be an approximation if an unlicensed spectrum is used due to LBT constraints), the broadcast time instance 310 for the post-PRS messages 210 including the post-PRS message 210 broadcast timing for the initiating UE and each responder UEs (integer for the slot number). In some implementations, the broadcast timing 308 may include PRS signals 208 from the responder UEs, e.g., if a licensed spectrum is used or may be an approximation if an unlicensed spectrum is used due to LBT constraints.

The use of the multivariable deterministic function, which is shared by all UEs in the ranging session, allows each UE to separately produce timing information for the support messages in the ranging session with little or no risk of errors. Thus, the size of the pre-PRS message 206 broadcast by the initiating UE may be significantly reduced, thereby permitting increased scalability with higher reliability, as collisions with messages from other ranging sessions will be reduced.

Figure 4:
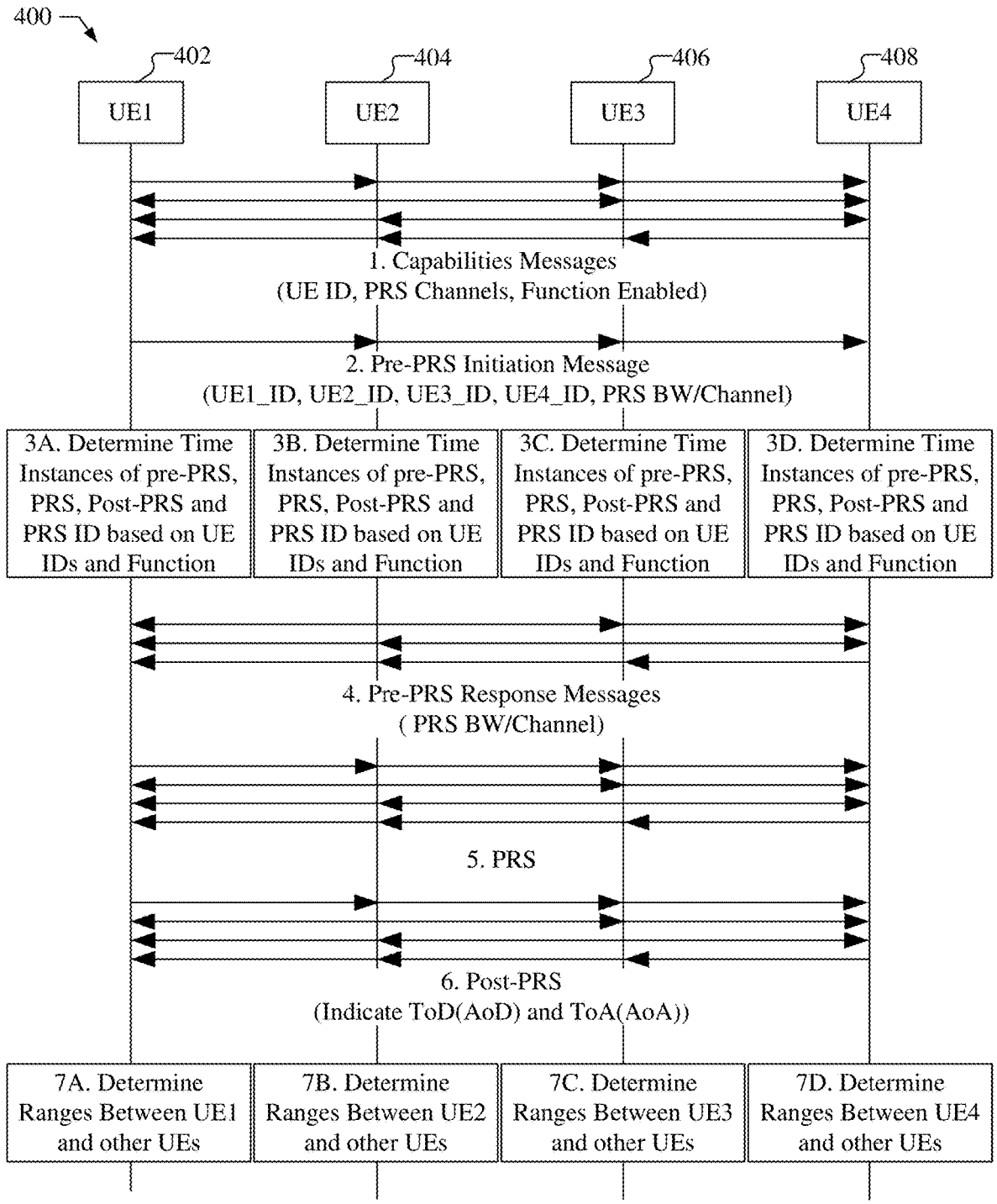
FIG. 4 illustrates an example of a signaling flow for a ranging procedure using a deterministic function to determine timing instances of signaling during the ranging and/or positioning session.

FIG. 4 illustrates an example of a signaling flow 400 for a ranging procedure using a deterministic function to determine timing instances of signaling during the ranging and/or positioning session, as described herein. The ranging procedure includes an initiating UE1 402 and multiple responder UEs, UE2 404, UE3 406, and UE4 408. The initiating and responder UEs 402, 404, 406, and 408 may be similar to one or more of the vehicle based UEs (V-UE) 102 and 104, RSU 110 or UE 112, as described in FIG. 1. It should be understood that FIG. 4 illustrates the signaling for a number of responder UEs, but that if desired additional or fewer responder UEs may be included in the ranging session, which would involve additional (or less) signaling than shown in FIG. 4. As illustrated, the communications between the UEs 402, 404, 406, and 408 in FIG. 4 may be direct communications between the entities and may not involve infrastructure devices, such as base stations, to forward the messages between the entities.

At stage 1, each initiating UE 402, and responder UEs 404, 406, and 408 broadcast capabilities messages, which are received by other nearby UEs. The capabilities messages may not be part of the ranging session but may include information that may be used by the initiating UE to initiate a ranging session with selected UEs. For example, the capabilities message may include the UE IDs (e.g., the L2 IDs), the ranging capability of the UE, the channel that the UE is configured to use, and an indication of the timing determination capability (e.g., whether the UE is capable of using a multivariable deterministic function to determining timing of messages in a ranging session). If there are a plurality of multivariable deterministic functions available, the capabilities message may indicate which multivariable deterministic function the UE is configured to perform. The capabilities messages in stage 1 may be periodically broadcast by the UEs.

At stage 2, the initiating UE1 402 prepares and broadcasts a pre-PRS message to request a ranging session with selected responder UEs 404, 406, and 408. The pre-PRS message may be broadcast via a licensed spectrum. As discussed above, the pre-PRS message prepared and broadcast by the initiating UE1 402 may include information such as the UE IDs (e.g., L2 IDs) of the initiating UE1 402 and the responder UEs 404, 406, and 408, as well as signaling information, such as the PRS bandwidth or channel for the initiating UE1 402, and in some implementations, the PRS IDs for the initiating UE1 402 and responder UEs 404, 406, and 408. The pre-PRS message from the initiating UE1 402 may include an indication of which multivariable deterministic function is to be used by the responder UEs to determining timing instances (e.g., if there are a plurality of multivariable deterministic functions available) but does not include timing information for the signaling in the ranging session, and may not include some signaling information, such as the PRS IDs. In some implementations, the pre-PRS message may further include a current position of the initiating UE1 402, e.g., if known.

At stage 3, including stages 3A, 3B, 3C, and 3D, each UE 402, 404, 406, and 408 determines the timing instances of messages in the ranging session based on the UE IDs of the initiating UE1 402 and responder UEs 404, 406, and 408 provided in the pre-PRS message in stage 2. In some implementations, the vector of UE IDs may be used to determine the timing instances of the messages in the ranging session, such as the timing instances of the pre-PRS messages from the responder UEs 404, 406, and 408 (and in some implementations, from the initiating UE1 402), the timing instance or approximate timing instance of PRS from the initiating UE1 402 (and in some implementations from the responder UEs 404, 406, and 408, and the timing instance of the post-PRS messages from the initiating UE1 402 and responder UEs 404, 406, and 408. Additionally, signaling information, such as the PRS ID for the initiating UE1 402 and responder UEs 404, 406, and 408, may be determined based on the UE IDs of the initiating UE1 402 and responder UEs 404, 406, and 408 provided in the pre-PRS message in stage 2. In some implementations, the order of UE IDs and/or the number of responder UEs may be used to determine the timing instances of the signaling in the ranging session. The unique timing instances (and optionally PRS IDs) may be separately determined by each UE using a shared multivariable deterministic function, such as a hash function or other similar function. It should be understood that while stage 3A by initiating UE1 402 is illustrated as being performed after broadcasting the pre-PRS initiation message in stage 2, in some implementations, the initiating UE1 402 may perform stage 3A before stage 2 and may broadcast the pre-PRS message from stage 2 consistent with the unique timing instance determined by the multivariable deterministic function. Moreover, if the pre-PRS message from stage 2 is broadcast at the determined unique timing instance, the responder UEs 404, 406, and 408 may likewise determine the unique timing instance for the pre-PRS message from the initiating UE1 402 using the multivariable deterministic function and time of reception of the pre-PRS message for clock alignment with the initiating UE1 402 and other responder UEs.

At stage 4, each responder UE 404, 406, and 408 broadcasts a pre-PRS message in response to the initial pre-PRS message and at the unique time instance for each responder UE determined in stages 3B, 3C, and 3D. The responding pre-PRS messages, for example, may acknowledge the initiating pre-PRS message from stage 2 and may provide signaling information, such as the PRS bandwidth or channel that will be used by the responder UE. The pre-PRS messages of stage 4 may be transmitted on a licensed spectrum. In some implementations, any of the pre-PRS messages broadcast by a responder UE may further include a current position of the responder UE, if known.

At stage 5, the PRS signals are broadcast by the initiating UE1 402 and responder UEs 404, 406, and 408. The PRS signal may be broadcast on an unlicensed spectrum in order to use a wide frequency band. The first PRS signal, e.g., from by the initiating UE1 402, may be broadcast at the time instance uniquely determined in stage 3. The following PRS signals, e.g., from the responder UEs 404, 406, and 408, may be broadcast in a specified order, e.g., as determined in stage 3, e.g., based on the vector of UE IDs, and based on LBT constraints. Alternatively, the following PRS signals, e.g., from the responder UEs 404, 406, and 408, may be broadcast at the time instance uniquely determined in stage 3, e.g., which may be approximate time instances if the PRS signals are broadcast on an unlicensed spectrum. Each broadcasting UE records the ToD of the broadcast PRS signal and in some implementations the AoD of the PRS signal and each receiving UE records the ToA of each received PRS signal and in some implementations the AoA of each received PRS signal.

At stage 6, post-PRS messages are broadcast by the initiating UE1 402 and responder UEs 404, 406, and 408, at the unique time instance for each UE determined in stages 3A, 3B, 3C, and 3D. The post-PRS messages, for example, may be transmitted on a licensed spectrum. The post-PRS messages from each UE indicates the ToD, and in some implementations the AoD, of the PRS signal broadcast by the UE and further indicates the ToA, and in some implementations the AoA, of each PRS signal received by the UE.

At stage 7, including stages 7A, 7B, 7C, and 7D, the initiating UE1 402 and each responder UE 404, 406, and 408 determine the range between itself and the other UEs in the ranging session based on the ToD and ToA of the PRS signals broadcast in stage 5. For example, the range may be determined based on the $ToD_i$ and $ToA_i$ for the $PRS_i$ signals (where i=1 for PRS broadcast from a first UE and i=2 for PRS broadcast from a second UE) as:

$$\text{Range} = \frac{(ToD_1 - ToA_2) - (ToA_1 - ToD_2)}{2c}. \quad \text{eq. 3}$$

If the position of one or more UEs is known, e.g., provided in pre-PRS messages in stages 2 or 4, and/or angle information, such as AoA or AoD of the PRS signals, and/or geographic information, such as street locations are known, the relative positions or actual position of the UEs may be determined using, e.g., multilateration, and constraints pursuant to the AoA or AoD of the PRS signals and geographic information.

In some implementations, stages 2-7 may be repeated for multiple instances of pre-PRS messages, PRS, and post-PRS messages, during the ranging session to provide higher accuracy.

Figure 5:
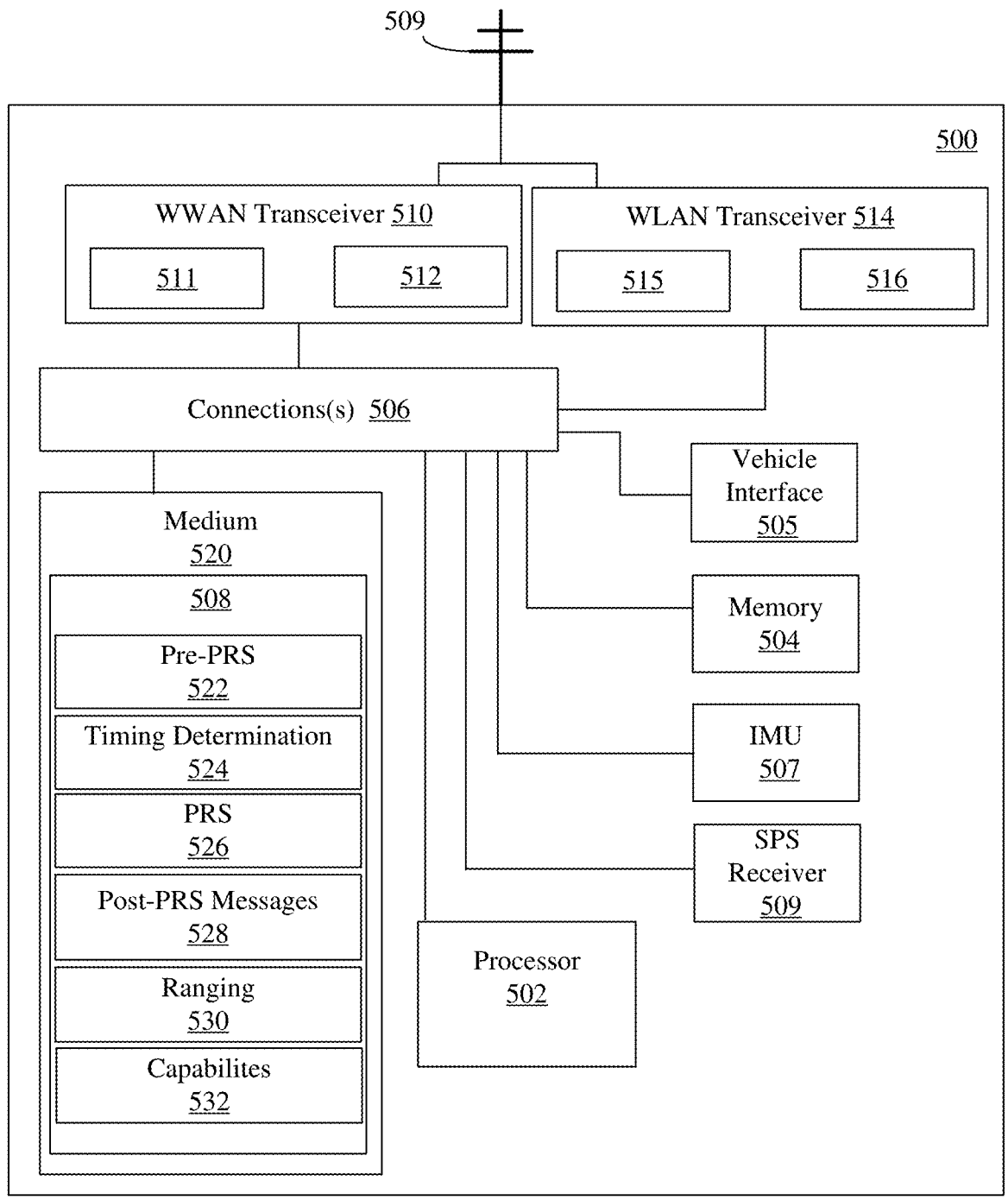
FIG. 5 shows a schematic block diagram illustrating certain exemplary features of a user equipment (UE), configured to use a deterministic function to determine timing instances of signaling during the ranging session.

FIG. 5 shows a schematic block diagram illustrating certain exemplary features of a user equipment (UE) 500, which may be UE in a vehicles 102 or 104, an RSU 110, or UE 112 held by a pedestrian 114, as illustrated in FIG. 1, or any UE illustrated in FIG. 4. The UE 500 may be configured to serve as an initiating UE or a responder UE in a ranging session in which a deterministic function is used to determine timing instances of signaling during the ranging session, as discussed herein. If the UE 500 is a V-UE, it may be configured to control the automated driving of a vehicle, e.g., vehicle 102. For example, the UE 500 may include a vehicle interface 505 with which commands are provided to the vehicle for automated driving and sensory input, including speed and acceleration, may be provided from the vehicle to UE 500. The UE 500 may, for example, include one or more processors 502, memory 504, an inertial measurement unit (IMU) 507 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 509 to determine, e.g., a GPS position, and an external interface including, e.g., a Wireless Wide Area Network (WWAN) transceiver 510, and a Wireless Local Area Network (WLAN) transceiver 514, which may be operatively coupled with one or more connections 506 (e.g., buses, lines, fibers, links, etc.) to non-transitory computer readable medium 520 and memory 504. The UE 500 may further include additional items, which are not shown, such as a user interface that may include e.g., a display, a keypad or other input device, such as virtual keypad on the display, through which a user may interface with the user device. In certain example implementations, all or part of UE 500 may take the form of a chipset, and/or the like.

Transceiver 510 may be, e.g., a cellular transceiver, that is configured to transmit and receive direct communications in the wireless network, as illustrated in FIG. 1. The transceiver 510 may include a transmitter 511 enabled to transmit one or more signals over one or more types of wireless communication networks and a receiver 512 to receive one or more signals transmitted over the one or more types of wireless communication networks. Transceiver 514 may be, e.g., a short range transceiver, and may be configured to transmit and receive direct communications in the wireless network, as illustrated in FIG. 1. The transceiver 514 may include a transmitter 515 enabled to transmit one or more signals, including PRS signals and pre-PRS and post-PRS messages, over one or more types of wireless communication networks and a receiver 516 to receive one or more signals, e.g., including PRS and pre-PRS and post-PRS messages, transmitted over the one or more types of wireless communication networks. The transceivers 510 and 514 enable the UE 500 to communicate with transportation entities using D2D communication links, such as DSRC, C-V2X, or 5G NR.

In some embodiments, UE 500 may include antenna 509, which may be internal or external. The antenna 509 may be used to transmit and/or receive signals processed by transceiver 510 and/or transceiver 514. In some embodiments, antenna 509 may be coupled to transceiver 510 and/or transceiver 514. In some embodiments, measurements of signals received (transmitted) by UE 500 may be performed at the point of connection of the antenna 509 and transceiver 510 and/or transceiver 514. For example, the measurement point of reference for received (transmitted) RF signal measurements may be an input (output) terminal of the receivers 512, 516 (transmitters 511, 515) and an output (input) terminal of the antenna 509. In a UE 500 with multiple antennas 509 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 500, e.g., based on the orientation of the UE 500 to the global or local reference frame as measured by the IMU 507.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include a pre-PRS module 522 that when implemented by the one or more processors 502 configures the one or more processors 502 to generate and transmit or receive pre-PRS messages via the transceiver 514, e.g., to initiate a ranging session or to accept a ranging session. The one or more processors 502 may be configured to broadcast the pre-PRS message via the transceiver 514 at a specific timing instance determined using the timing determination module 524. The pre-PRS message may include UE IDs for the initiating UE and the responder UEs, e.g., in a vector of UE IDs. The UE IDs, for example, may be L2 IDs, that may be obtained from capability messages periodically broadcast by the UEs. The pre-PRS message sent by the initiating UE may include an indication that the timing instances for the messages in the ranging session will be determined using a function using the IDs for the initiating UE and responder UEs. The pre-PRS message may include an indication of a channel for a ranging signal to be broadcast by the UE but may not include any timing information for the ranging session. In some implementations, the pre-PRS message may include position information for the UE 500 if known.

The medium 520 and/or memory 504 may include a timing determination module 524 that when implemented by the one or more processors 502 configures the one or more processors 502 to determine timing instances for messages from the initiating UE and each of the one or more responder UEs in the ranging session based on the UE IDs for the initiating UE and each of the one or more responder UEs. The one or more processors 502 may be configured to determine the timing instances for the messages in the ranging session based on the UE IDs, as well as based on the order of the UE IDs provided in the pre-PRS message and based on the number of responder UEs. The timing instances may be determined uniquely. For example, a multivariable deterministic function, such as a hash function, may be used to determine the timing instances for the messages in the ranging session based on the UE IDs, wherein the multivariable deterministic function is shared, i.e., commonly used by, each UE in the ranging session. The multivariable deterministic function may use a vector of UE IDs, including the implicit order of UE IDs and number of responder UEs as an input and may output the timing instances of the pre-PRS messages and post-PRS messages. The timing instance of one or more PRS signals (or approximate timing instance if PRS is transmitted on an unlicensed spectrum) may further be output. Signaling information, such as PRS IDs for each UE in the ranging session may be further output.

The medium 520 and/or memory 504 may include a PRS module 526 that when implemented by the one or more processors 502 configures the one or more processors 502 to broadcast to other UEs and receive, via the via the transceiver 514, a ranging signal, e.g., on an unlicensed spectrum. The one or more processors 502 may be configured to broadcast a ranging signal via the transceiver 514 at a specific timing instance or at approximately the timing instance determined using the timing determination module 524 and/or based on LBT considerations if using the PRS signal is broadcast on an unlicensed spectrum. The ranging signal, for example, may be a PRS signal as discussed herein. The one or more processors 502, for example, may be configured to measure the ToD of broadcast ranging signals and the ToA of received ranging signals, and may be configured to measure the AoD of broadcast ranging signals and the AoA of received ranging signals.

The medium 520 and/or memory 504 may include a post-PRS module 528 that when implemented by the one or more processors 502 configures the one or more processors 502 to send to other UEs and receive, via the via the transceiver 514, post-PRS messages that may include, e.g., indicating the ToD, and in some implementations the AoD, of the broadcast ranging signals and indicating the ToA, and in some implementations the AoA, of the received ranging signals. The one or more processors 502 may be configured to broadcast the post-PRS message via the transceiver 514 at a specific timing instance determined using the timing determination module 524.

The medium 520 and/or memory 504 may include a ranging module 530 that when implemented by the one or more processors 502 configures the one or more processors 502 to determine a range to another UE based on the ToD and ToA of broadcast and received ranging signals as measured by the UE 500 and received in the post-PRS message. The processor 502 may be further configured to determine a position of the UE 500, e.g., based on one or more ranges to broadcasting UEs and their location information using multilateration or other appropriate techniques discussed herein, such as using angle information and geographic information.

The medium 520 and/or memory 504 may include a capability module 532 that when implemented by the one or more processors 502 configures the one or more processors 502 to broadcast and receive, via the via the transceiver 514, a capability message that includes the UE ID, e.g., L2 ID, the bandwidth or channel that the UE is configured to use, and an indication of timing determination capability, e.g., that the UE is capable determining timing instances of messages in a ranging session using a deterministic function, and in some implementations, which deterministic function the UE is configured to use.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program 508. For example, the non-transitory computer readable medium including program code 508 stored thereon may include program code 508 to support ranging sessions using a deterministic function to determine timing instances of signaling during the ranging session, in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable code 508 stored thereon, which if executed by one or more processors 502 may be operatively enabled to perform all or portions of the example operations as described herein. Computer readable medium 520 may be a part of memory 504.

Figure 6:
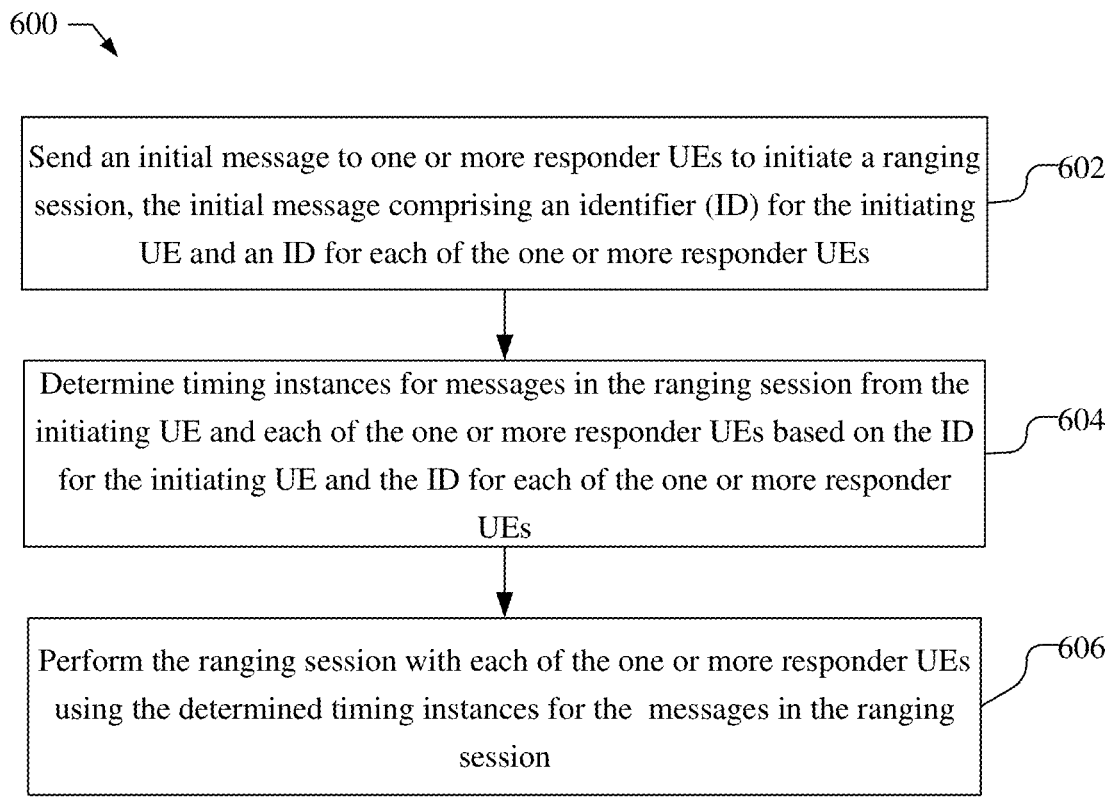
FIG. 6 is a flow chart illustrating a method of ranging between UEs performed by an initiating UE in a ranging session.

FIG. 6 is a flow chart 600 illustrating a method of ranging between user equipments (UEs) performed by an initiating UE in the ranging session, such as V-UE 102, V-UE 104, RSU 110 or UE 112.

At block 602, an initial message is sent to one or more responder UEs to initiate a ranging session, the initial message comprising an identifier (ID) for the initiating UE and an ID for each of the one or more responder UEs, e.g., as discussed at stage 2 of FIG. 4. The ID for the initiating UE and an ID for each of the one or more responder UEs, for example, may be a vector of IDs. The IDs may be L2 IDs. In some implementations, the initial message may further comprise an indication that the timing instances for the messages in the ranging session will be determined using a function using the ID for the initiating UE and the ID for each of the one or more responder UEs as inputs, e.g., as discussed at stage 2 of FIG. 4. In some implementations, the initial message may further comprise an indication of a channel for a ranging signal to be broadcast by the initiating UE, e.g., as discussed at stage 2 of FIG. 4. The initial message may not include any timing information for the ranging session, e.g., as discussed at stage 2 of FIG. 4. A means for sending an initial message to one or more responder UEs to initiate a ranging session, the initial message comprising an identifier (ID) for the initiating UE and an ID for each of the one or more responder UEs may be, e.g., the transceiver 514 and the one or more processors 502 with dedicated hardware or implementing executable code or software instructions in memory 504 and/or medium 520, such as the pre-PRS module 522 in UE 500.

At block 604, timing instances are determined for messages in the ranging session from the initiating UE and each of the one or more responder UEs based on the ID for the initiating UE and the ID for each of the one or more responder UEs, e.g., as discussed at stage 3A of FIG. 4. In some implementations, block 604 may be performed before block 602. In some implementations, the timing instances for the messages in the ranging session are determined further based on an order of the IDs for the initiating UE and each of the one or more responder UEs. In some implementations, the timing instances for the messages in the ranging session are determined uniquely. A means for determining timing instances for messages in the ranging session from the initiating UE and each of the one or more responder UEs based on the ID for the initiating UE and the ID for each of the one or more responder UEs may be, e.g., the one or more processors 502 with dedicated hardware or implementing executable code or software instructions in memory 504 and/or medium 520, such as the timing determination module 524 in UE 500.

At block 606, the ranging session may be performed with each of the one or more responder UEs using the determined timing instances for the messages in the ranging session, e.g., as discussed at stages 4, 5, 6, and 7A. A means for performing the ranging session with each of the one or more responder UEs using the determined timing instances for the messages in the ranging session may be, e.g., the transceiver 514 and the one or more processors 502 with dedicated hardware or implementing executable code or software instructions in memory 504 and/or medium 520, such as the PRS module 526, the post-PRS module 528 and the ranging module 530 UE 500.

In one implementation, the timing instances for the messages in the ranging session may be determined using a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session, e.g., as discussed at stages 3A, 3B, 3C, and 3D. A means for using a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session may be, e.g., the one or more processors 502 with dedicated hardware or implementing executable code or software instructions in memory 504 and/or medium 520, such as the timing determination module 524 in UE 500.

In some implementations, the UE may further determine ranging signal identifiers in the ranging session for the initiating UE and each of the one or more responder UEs based on the ID for the initiating UE and the ID for each of the one or more responder UEs, e.g., as discussed at stage 3A of FIG. 4. A means for determining ranging signal identifiers in the ranging session for the initiating UE and each of the one or more responder UEs based on the ID for the initiating UE and the ID for each of the one or more responder UEs may be, e.g., the one or more processors 502 with dedicated hardware or implementing executable code or software instructions in memory 504 and/or medium 520, such as the timing determination module 524 in UE 500.

In some implementations, the ranging session may be performed by receiving an initial response message from each of the one or more responder UEs based on the determined timing instances, as discussed at stage 4 of FIG. 4; broadcasting a ranging signal and receiving a responding ranging signal broadcast by each of the one or more responder UEs, as discussed at stage 5 of FIG. 4; sending a post ranging signal message to each of the one or more responder UEs based on the determined timing instances and receiving a responding post ranging signal message from each of the one or more responder UEs based on the determined timing instances, as discussed at stage 6 of FIG. 4; and determining a range to each of the one or more responder UEs, as discussed at stage 7A of FIG. 4. By way of example, the post ranging signal message may comprise a time of departure of the ranging signal and a time of arrival of the responding ranging signal received from each of the one or more responder UEs, and the responding post ranging signal message from each of the one or more responder UEs may comprise a time of arrival of the ranging signal and a time of departure of the responding ranging signal broadcast by each of the one or more responder UEs, wherein determining the range to each of the one or more responder UEs may use the time of departure and the time of arrival of the ranging signal and the time of arrival and the time of departure of the responding post ranging signal message. A means for receiving an initial response message from each of the one or more responder UEs based on the determined timing instances may be, e.g., the transceiver 514 and the one or more processors 502 with dedicated hardware or implementing executable code or software instructions in memory 504 and/or medium 520, such as the pre-PRS module 522 in UE 500. A means for broadcasting a ranging signal and a means for receiving a responding ranging signal broadcast by each of the one or more responder UEs may be, e.g., the transceiver 514 and the one or more processors 502 with dedicated hardware or implementing executable code or software instructions in memory 504 and/or medium 520, such as the PRS module 526 in UE 500. A means for sending a post ranging signal message to each of the one or more responder UEs based on the determined timing instances and a means for receiving a responding post ranging signal message from each of the one or more responder UEs based on the determined timing instances may be, e.g., the transceiver 514 and the one or more processors 502 with dedicated hardware or implementing executable code or software instructions in memory 504 and/or medium 520, such as the post-PRS module 528 in UE 500. A means for determining a range to each of the one or more responder UEs may be, e.g., the one or more processors 502 with dedicated hardware or implementing executable code or software instructions in memory 504 and/or medium 520, such as the ranging module 530 in UE 500.

In some implementations, the UE may further receive a capability message from each of the one or more responder UEs before sending the initial message, wherein each capability message comprises an ID for a responder UE, as discussed at stage 1 of FIG. 4. Each capability message may further include an indication that the responder UE is capable of determining timing instances for the messages in the ranging session based on the ID for the initiating UE and the ID for each of the one or more responder UEs. A means for receiving a capability message from each of the one or more responder UEs before sending the initial message, wherein each capability message comprises an ID for a responder UE may be, e.g., the transceiver 514 and the one or more processors 502 with dedicated hardware or implementing executable code or software instructions in memory 504 and/or medium 520, such as the capability module 532 in UE 500.

Figure 7:
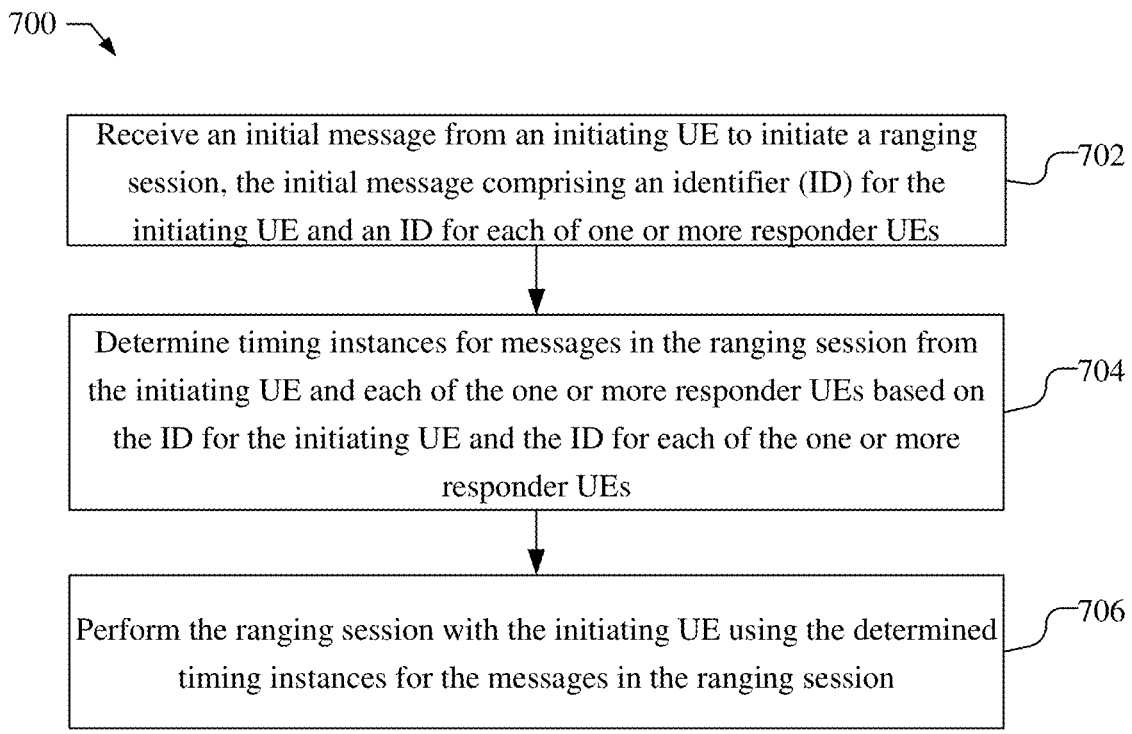
FIG. 7 is a flow chart illustrating a method of ranging between UEs performed by a responder UE in a ranging session.

FIG. 7 is a flow chart 700 illustrating a method of ranging between user equipments (UEs) performed by a responder UE in the ranging session, such as V-UE 102, V-UE 104, RSU 110 or UE 112.

At block 702, an initial message is received from an initiating UE to initiate a ranging session, the initial message comprising an identifier (ID) for the initiating UE and an ID for each of one or more responder UEs, e.g., as discussed at stage 2 of FIG. 4. The ID for the initiating UE and an ID for each of the one or more responder UEs, for example, may be a vector of IDs. The IDs may be L2 IDs. In some implementations, the initial message may further comprise an indication that the timing instances for the messages in the ranging session will be determined using a function using the ID for the initiating UE and the ID for each of the one or more responder UEs as inputs, e.g., as discussed at stage 2 of FIG. 4. In some implementations, the initial message may further comprise an indication of a channel for a ranging signal to be broadcast by the initiating UE, e.g., as discussed at stage 2 of FIG. 4. The initial message may not include any timing information for the ranging session, e.g., as discussed at stage 2 of FIG. 4. A means for receiving an initial message from an initiating UE to initiate a ranging session, the initial message comprising an identifier (ID) for the initiating UE and an ID for each of one or more responder UEs may be, e.g., the transceiver 514 and the one or more processors 502 with dedicated hardware or implementing executable code or software instructions in memory 504 and/or medium 520, such as the pre-PRS module 522 in UE 500.

At block 704, timing instances are determined for messages in the ranging session from the initiating UE and each of the one or more responder UEs based on the ID for the initiating UE and the ID for each of the one or more responder UEs, e.g., as discussed at stage 3B of FIG. 4. In some implementations, the timing instances for the messages in the ranging session are determined further based on an order of the IDs for the initiating UE and each of the one or more responder UEs. In some implementations, the timing instances for the messages in the ranging session are determined uniquely. A means for determining timing instances for messages in the ranging session from the initiating UE and each of the one or more responder UEs based on the ID for the initiating UE and the ID for each of the one or more responder UEs may be, e.g., the one or more processors 502 with dedicated hardware or implementing executable code or software instructions in memory 504 and/or medium 520, such as the timing determination module 524 in UE 500.

At block 706, the ranging session may be performed with the initiating UE using the determined timing instances for the messages in the ranging session, e.g., as discussed at stages 4, 5, 6, and 7B. A means for performing the ranging session with the initiating UE using the determined timing instances for the messages in the ranging session may be, e.g., the transceiver 514 and the one or more processors 502 with dedicated hardware or implementing executable code or software instructions in memory 504 and/or medium 520, such as the PRS module 526, the post-PRS module 528 and the ranging module 530 UE 500.

In one implementation, the timing instances for the messages in the ranging session may be determined using a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session, e.g., as discussed at stages 3A, 3B, 3C, and 3D. A means for using a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session may be, e.g., the one or more processors 502 with dedicated hardware or implementing executable code or software instructions in memory 504 and/or medium 520, such as the timing determination module 524 in UE 500.

In some implementations, the UE may further determine ranging signal identifiers in the ranging session for the initiating UE and each of the one or more responder UEs based on the ID for the initiating UE and the ID for each of the one or more responder UEs, e.g., as discussed at stage 3A of FIG. 4. A means for determining ranging signal identifiers in the ranging session for the initiating UE and each of the one or more responder UEs based on the ID for the initiating UE and the ID for each of the one or more responder UEs may be, e.g., the one or more processors 502 with dedicated hardware or implementing executable code or software instructions in memory 504 and/or medium 520, such as the timing determination module 524 in UE 500.

In some implementations, the ranging session may be performed by sending an initial response message to the initiating UE based on the determined timing instances, as discussed at stage 4 of FIG. 4; receiving a ranging signal broadcast by the initiating UE and broadcasting a responding ranging signal broadcast, as discussed at stage 5 of FIG. 4; receiving a post ranging signal message from the initiating UE based on the determined timing instances and sending a responding post ranging signal message to the initiating UE based on the determined timing instances, as discussed at stage 6 of FIG. 4; and determining a range to the initiating UE, as discussed at stage 7B of FIG. 4. By way of example, the post ranging signal message received from the initiating UE may comprise a time of departure of the ranging signal and a time of arrival of the responding ranging signal, and the responding post ranging signal message sent to the initiating UE may comprise a time of arrival of the ranging signal and a time of departure of the responding ranging signal broadcast by each of the one or more responder UEs, and wherein determining the range to the initiating UE may use the time of departure and the time of arrival of the ranging signal and the time of arrival and the time of departure of the responding post ranging signal message. A means for sending an initial response message to the initiating UE based on the determined timing instances may be, e.g., the transceiver 514 and the one or more processors 502 with dedicated hardware or implementing executable code or software instructions in memory 504 and/or medium 520, such as the pre-PRS module 522 in UE 500. A means for receiving a ranging signal broadcast by the initiating UE and a means for broadcasting a responding ranging signal broadcast may be, e.g., the transceiver 514 and the one or more processors 502 with dedicated hardware or implementing executable code or software instructions in memory 504 and/or medium 520, such as the PRS module 526 in UE 500. A means for receiving a post ranging signal message from the initiating UE based on the determined timing instances and a means for sending a responding post ranging signal message to the initiating UE based on the determined timing instances may be, e.g., the transceiver 514 and the one or more processors 502 with dedicated hardware or implementing executable code or software instructions in memory 504 and/or medium 520, such as the post-PRS module 528 in UE 500. A means for determining a range to the initiating UE may be, e.g., the one or more processors 502 with dedicated hardware or implementing executable code or software instructions in memory 504 and/or medium 520, such as the ranging module 530 in UE 500.

In some implementations, the UE may further broadcast a capability message before receiving the initial message, wherein the capability message comprises an ID for the responder UE, as discussed at stage 1 of FIG. 4. The capability message may further comprise an indication that the responder UE is capable of determining timing instances for the messages in the ranging session based on the ID for the initiating UE and the ID for each of the one or more responder UEs. A means for broadcasting a capability message before receiving the initial message, wherein the capability message comprises an ID for the responder UE may be, e.g., the transceiver 514 and the one or more processors 502 with dedicated hardware or implementing executable code or software instructions in memory 504 and/or medium 520, such as the capability module 532 in UE 500.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of ranging between user equipments (UEs) performed by an initiating UE, the method comprising:
sending an initial message to one or more responder UEs to initiate a ranging session, the initial message comprising an identifier (ID) for the initiating UE and an ID for each of the one or more responder UEs;
determining timing instances for messages in the ranging session from the initiating UE and each of the one or more responder UEs based on the ID for the initiating UE and the ID for each of the one or more responder UEs; and
performing the ranging session with each of the one or more responder UEs using the determined timing instances for the messages in the ranging session.

2. The method of clause 1, wherein determining the timing instances for the messages in the ranging session comprises using a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session.

3. The method of either of clauses 1 or 2, wherein determining the timing instances for the messages in the ranging session is further based on an order of the IDs for the initiating UE and each of the one or more responder UEs.

4. The method of any of clauses clause 1-3, wherein the timing instances for the messages in the ranging session are determined uniquely.

5. The method of any of clauses clause 1-4, further comprising determining ranging signal identifiers in the ranging session for the initiating UE and each of the one or more responder UEs based on the ID for the initiating UE and the ID for each of the one or more responder UEs.

6. The method of any of clauses clause 1-5, wherein the initial message further comprises an indication that the timing instances for the messages in the ranging session will be determined using a function using the ID for the initiating UE and the ID for each of the one or more responder UEs as inputs.

7. The method of any of clauses clause 1-6, wherein the initial message further comprises an indication of a channel for a ranging signal to be broadcast by the initiating UE.

8. The method of any of clauses clause 1-7, wherein the initial message does not include timing information for the ranging session.

9. The method of any of clauses clause 1-8, wherein performing the ranging session comprises:
receiving an initial response message from each of the one or more responder UEs based on the determined timing instances;
broadcasting a ranging signal;
receiving a responding ranging signal broadcast by each of the one or more responder UEs;
sending a post ranging signal message to each of the one or more responder UEs based on the determined timing instances;
receiving a responding post ranging signal message from each of the one or more responder UEs based on the determined timing instances; and
determining a range to each of the one or more responder UEs.

10. The method of clause 9, where the post ranging signal message comprises a time of departure of the ranging signal and a time of arrival of the responding ranging signal received from each of the one or more responder UEs, and the responding post ranging signal message from each of the one or more responder UEs comprises a time of arrival of the ranging signal and a time of departure of the responding ranging signal broadcast by each of the one or more responder UEs, and wherein determining the range to each of the one or more responder UEs uses the time of departure and the time of arrival of the ranging signal and the time of arrival and the time of departure of the responding post ranging signal message.

11. The method of any of clauses clause 1-10, further comprising receiving a capability message from each of the one or more responder UEs before sending the initial message, wherein each capability message comprises an ID for a responder UE.

12. The method of clause 11, wherein each capability message further comprises an indication that the responder UE is capable of determining timing instances for the messages in the ranging session based on the ID for the initiating UE and the ID for each of the one or more responder UEs.

13. A user equipment (UE) configured to perform a ranging session between UEs, the UE being an initiating UE in the ranging session, the UE comprising:
a wireless transceiver configured to wirelessly communicate with entities in a wireless network;
at least one memory; and
at least one processor coupled to the wireless transceiver and the at least one memory, wherein the at least one processor is configured to:
send an initial message to one or more responder UEs to initiate a ranging session, the initial message comprising an identifier (ID) for the initiating UE and an ID for each of the one or more responder UEs;
determine timing instances for messages in the ranging session from the initiating UE and each of the one or more responder UEs based on the ID for the initiating UE and the ID for each of the one or more responder UEs; and
perform the ranging session with each of the one or more responder UEs using the determined timing instances for the messages in the ranging session.

14. The UE of clause 13, wherein the at least one processor is configured to determine the timing instances for the messages in the ranging session by being configured to use a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session.

15. The UE of either of clauses 13 or 14, wherein the at least one processor is configured to determine the timing instances for the messages in the ranging session further based on an order of the IDs for the initiating UE and each of the one or more responder UEs.

16. The UE of any of clauses 13-15, wherein the timing instances for the messages in the ranging session are determined uniquely.

17. The UE of any of clauses 13-16, wherein the at least one processor is further configured to determine ranging signal identifiers in the ranging session for the initiating UE and each of the one or more responder UEs based on the ID for the initiating UE and the ID for each of the one or more responder UEs.

18. The UE of any of clauses 13-17, wherein the initial message further comprises an indication that the timing instances for the messages in the ranging session will be determined using a function using the ID for the initiating UE and the ID for each of the one or more responder UEs as inputs.

19. The UE of any of clauses 13-18, wherein the initial message further comprises an indication of a channel for a ranging signal to be broadcast by the initiating UE.

20. The UE of any of clauses 13-19, wherein the initial message does not include timing information for the ranging session.

21. The UE of any of clauses 13-20, wherein the at least one processor is configured to perform the ranging session by being configured to:
receive an initial response message from each of the one or more responder UEs based on the determined timing instances;
broadcast a ranging signal;
receive a responding ranging signal broadcast by each of the one or more responder UEs;
send a post ranging signal message to each of the one or more responder UEs based on the determined timing instances;
receive a responding post ranging signal message from each of the one or more responder UEs based on the determined timing instances; and
determine a range to each of the one or more responder UEs.

22. The UE of clause 21, where the post ranging signal message comprises a time of departure of the ranging signal and a time of arrival of the responding ranging signal received from each of the one or more responder UEs, and the responding post ranging signal message from each of the one or more responder UEs comprises a time of arrival of the ranging signal and a time of departure of the responding ranging signal broadcast by each of the one or more responder UEs, and wherein the at least one processor is configured to determine the range to each of the one or more responder UEs based on the time of departure and the time of arrival of the ranging signal and the time of arrival and the time of departure of the responding post ranging signal message.

23. The UE of any of clauses 13-22, wherein the at least one processor is further configured to receive a capability message from each of the one or more responder UEs before the initial message is sent, wherein each capability message comprises an ID for a responder UE.

24. The UE of clause 23, wherein each capability message further comprises an indication that the responder UE is capable of determining timing instances for the messages in the ranging session based on the ID for the initiating UE and the ID for each of the one or more responder UEs.

25. A user equipment (UE) configured to perform ranging between UEs, the UE being an initiating UE in the ranging session, the UE comprising:
means for sending an initial message to one or more responder UEs to initiate a ranging session, the initial message comprising an identifier (ID) for the initiating UE and an ID for each of the one or more responder UEs;
means for determining timing instances for messages in the ranging session from the initiating UE and each of the one or more responder UEs based on the ID for the initiating UE and the ID for each of the one or more responder UEs; and
means for performing the ranging session with each of the one or more responder UEs using the determined timing instances for the messages in the ranging session.

26. The UE of clause 25, wherein the means for determining the timing instances for the messages in the ranging session comprises means for using a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session.

27. The UE of either of clauses 25 or 26, wherein the means for determining the timing instances for the messages in the ranging session further uses an order of the IDs for the initiating UE and each of the one or more responder UEs.

28. A non-transitory storage medium including program code stored thereon, the program code is operable to configure at least one processor in a user equipment (UE) to perform ranging between UEs, the UE being an initiating UE in the ranging session, the non-transitory storage medium comprising:
program code to send an initial message to one or more responder UEs to initiate a ranging session, the initial message comprising an identifier (ID) for the initiating UE and an ID for each of the one or more responder UEs;
program code to determine timing instances for messages in the ranging session from the initiating UE and each of the one or more responder UEs based on the ID for the initiating UE and the ID for each of the one or more responder UEs; and
program code to perform the ranging session with each of the one or more responder UEs using the determined timing instances for the messages in the ranging session.

29. The non-transitory storage medium of clause 28, wherein the program code to determine the timing instances for the messages in the ranging session comprises program code to use a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session.

30. The non-transitory storage medium of either of clauses 28 or 29, wherein the program code to determine the timing instances for the messages in the ranging session further uses an order of the IDs for the initiating UE and each of the one or more responder UEs.

31. A method of ranging between user equipments (UEs) performed by a responder UE, the method comprising:
receiving an initial message from an initiating UE to initiate a ranging session, the initial message comprising an identifier (ID) for the initiating UE and an ID for each of one or more responder UEs;
determining timing instances for messages in the ranging session from the initiating UE and each of the one or more responder UEs based on the ID for the initiating UE and the ID for each of the one or more responder UEs; and
performing the ranging session with the initiating UE using the determined timing instances for the messages in the ranging session.

32. The method of clause 31, wherein determining the timing instances for the messages in the ranging session comprises using a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session.

33. The method of either of clauses 31 or 32, wherein determining the timing instances for the messages in the ranging session is further based on an order of the IDs for the initiating UE and each of the one or more responder UEs.

34. The method of any of clauses 31-33, wherein the timing instances for the messages in the ranging session are determined uniquely.

35. The method of any of clauses 31-34, further comprising determining ranging signal identifiers in the ranging session for the initiating UE and each of the one or more responder UEs based on the ID for the initiating UE and the ID for each of the one or more responder UEs.

36. The method of any of clauses 31-35, wherein the initial message further comprises an indication that the timing instances for the messages in the ranging session will be determined using a function using the ID for the initiating UE and the ID for each of the one or more responder UEs as inputs.

37. The method of any of clauses 31-36, wherein the initial message further comprises an indication of a channel for a ranging signal to be broadcast by the initiating UE.

38. The method of any of clauses 31-37, wherein the initial message does not include timing information for the ranging session.

39. The method of any of clauses 31-38, wherein performing the ranging session comprises:
sending an initial response message to the initiating UE based on the determined timing instances;
receiving a ranging signal broadcast by the initiating UE;
broadcasting a responding ranging signal broadcast;
receiving a post ranging signal message from the initiating UE based on the determined timing instances;

sending a responding post ranging signal message to the initiating UE based on the determined timing instances; and determining a range to the initiating UE.

40. The method of clause 39, where the post ranging signal message received from the initiating UE comprises a time of departure of the ranging signal and a time of arrival of the responding ranging signal, and the responding post ranging signal message sent to the initiating UE comprises a time of arrival of the ranging signal and a time of departure of the responding ranging signal broadcast by each of the one or more responder UEs, and wherein determining the range to the initiating UE uses the time of departure and the time of arrival of the ranging signal and the time of arrival and the time of departure of the responding post ranging signal message.

41. The method of any of clauses 31-40, further comprising broadcasting a capability message before receiving the initial message, wherein the capability message comprises an ID for the responder UE.

42. The method of clause 41, wherein the capability message further comprises an indication that the responder UE is capable of determining timing instances for the messages in the ranging session based on the ID for the initiating UE and the ID for each of the one or more responder UEs.

43. A user equipment (UE) configured to perform a ranging session between UEs, the UE being a responder UE in the ranging session, the UE comprising:

a wireless transceiver configured to wirelessly communicate with entities in a wireless network;

at least one memory; and at least one processor coupled to the wireless transceiver and the at least one memory, wherein the at least one processor is configured to:

receive an initial message from an initiating UE to initiate a ranging session, the initial message comprising an identifier (ID) for the initiating UE and an ID for each of one or more responder UEs;

determine timing instances for messages in the ranging session from the initiating UE and each of the one or more responder UEs based on the ID for the initiating UE and the ID for each of the one or more responder UEs; and perform the ranging session with the initiating UE using the determined timing instances for the messages in the ranging session.

44. The UE of clause 43, wherein the at least one processor is configured to determine the timing instances for the messages in the ranging session by being configured to use a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session.

45. The UE of either of clauses 43 or 44, wherein the at least one processor is configured to determine the timing instances for the messages in the ranging session further based on an order of the IDs for the initiating UE and each of the one or more responder UEs.

46. The UE of any of clauses 43-45, wherein the timing instances for the messages in the ranging session are determined uniquely.

47. The UE of any of clauses 43-46, wherein the at least one processor is further configured to determine ranging signal identifiers in the ranging session for the initiating UE and each of the one or more responder UEs based on the ID for the initiating UE and the ID for each of the one or more responder UEs.

48. The UE of any of clauses 43-47, wherein the initial message further comprises an indication that the timing instances for the messages in the ranging session will be determined using a function using the ID for the initiating UE and the ID for each of the one or more responder UEs as inputs.

49. The UE of any of clauses 43-48, wherein the initial message further comprises an indication of a channel for a ranging signal to be broadcast by the initiating UE.

50. The UE of any of clauses 43-49, wherein the initial message does not include timing information for the ranging session.

51. The UE of any of clauses 43-50, wherein the at least one processor is configured to perform the ranging session by being configured to:

send an initial response message to the initiating UE based on the determined timing instances;

receive a ranging signal broadcast by the initiating UE;

broadcast a responding ranging signal broadcast;

receive a post ranging signal message from the initiating UE based on the determined timing instances;

send a responding post ranging signal message to the initiating UE based on the determined timing instances; and determine a range to the initiating UE.

52. The UE of clause 51, where the post ranging signal message received from the initiating UE comprises a time of departure of the ranging signal and a time of arrival of the responding ranging signal, and the responding post ranging signal message sent to the initiating UE comprises a time of arrival of the ranging signal and a time of departure of the responding ranging signal broadcast by each of the one or more responder UEs, and wherein the at least one processor is configured to determine the range to the initiating UE based on the time of departure and the time of arrival of the ranging signal and the time of arrival and the time of departure of the responding post ranging signal message.

53. The UE of any of clauses 43-52, wherein the at least one processor is further configured to broadcast a capability message before receiving the initial message, wherein the capability message comprises an ID for the responder UE.

54. The UE of clause 53, wherein the capability message further comprises an indication that the responder UE is capable of determining timing instances for the messages in the ranging session based on the ID for the initiating UE and the ID for each of the one or more responder UEs.

55. A user equipment (UE) configured to perform a ranging session between UEs, the UE being a responder UE in the ranging session, the UE comprising:

means for receiving an initial message from an initiating UE to initiate a ranging session, the initial message comprising an identifier (ID) for the initiating UE and an ID for each of one or more responder UEs;

means for determining timing instances for messages in the ranging session from the initiating UE and each of the one or more responder UEs based on the ID for the initiating UE and the ID for each of the one or more responder UEs; and means for performing the ranging session with the initiating UE using the determined timing instances for the messages in the ranging session.

56. The UE of clause 55, wherein the means for determining the timing instances for the messages in the ranging session comprises means for using a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session.

57. The UE of either of clauses 55 or 56, wherein the means for determining the timing instances for the messages in the ranging session further uses an order of the IDs for the initiating UE and each of the one or more responder UEs.

58. A non-transitory storage medium including program code stored thereon, the program code is operable to configure at least one processor in a user equipment (UE) to perform a ranging session between UEs, the UE being a responder UE in the ranging session, the non-transitory storage medium comprising:
  program code to receive an initial message from an initiating UE to initiate a ranging session, the initial message comprising an identifier (ID) for the initiating UE and an ID for each of one or more responder UEs;
  program code to determine timing instances for messages in the ranging session from the initiating UE and each of the one or more responder UEs based on the ID for the initiating UE and the ID for each of the one or more responder UEs; and
  program code to perform the ranging session with the initiating UE using the determined timing instances for the messages in the ranging session.

59. The non-transitory storage medium of clause 58, wherein the program code to determine the timing instances for the messages in the ranging session comprises program code to use a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session.

60. The non-transitory storage medium of either of clauses 58 or 59, wherein the program code to determine the timing instances for the messages in the ranging session further uses an order of the IDs for the initiating UE and each of the one or more responder UEs.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between user equipments (UEs) performed by an initiating UE, the method comprising:
  sending an initial message to one or more responder UEs to initiate a ranging session, the initial message comprising an identifier (ID) for the initiating UE and an ID for each of the one or more responder UEs;
  determining timing instances for messages in the ranging session from the initiating UE and each of the one or more responder UEs based on the ID for the initiating UE and the ID for each of the one or more responder UEs; and
  performing the ranging session with each of the one or more responder UEs using the determined timing instances for the messages in the ranging session.

2. The method of claim 1, wherein determining the timing instances for the messages in the ranging session comprises using a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session, and the timing instances for the messages in the ranging session are determined uniquely.

3. The method of claim 1, wherein determining the timing instances for the messages in the ranging session is further based on an order of the IDs for the initiating UE and each of the one or more responder UEs.

4. The method of claim 1, further comprising determining ranging signal identifiers in the ranging session for the initiating UE and each of the one or more responder UEs based on the ID for the initiating UE and the ID for each of the one or more responder UEs.

5. The method of claim 1, wherein the initial message further comprises an indication that the timing instances for the messages in the ranging session will be determined using a function using the ID for the initiating UE and the ID for each of the one or more responder UEs as inputs.

6. The method of claim 1, wherein the initial message further comprises an indication of a channel for a ranging signal to be broadcast by the initiating UE.

7. The method of claim 1, wherein the initial message does not include timing information for the ranging session.

8. The method of claim 1, wherein performing the ranging session comprises:
  receiving an initial response message from each of the one or more responder UEs based on the determined timing instances;
  broadcasting a ranging signal;
  receiving a responding ranging signal broadcast by each of the one or more responder UEs;
  sending a post ranging signal message to each of the one or more responder UEs based on the determined timing instances;
  receiving a responding post ranging signal message from each of the one or more responder UEs based on the determined timing instances; and
  determining a range to each of the one or more responder UEs.

9. The method of claim 8, where the post ranging signal message comprises a time of departure of the ranging signal and a time of arrival of the responding ranging signal received from each of the one or more responder UEs, and the responding post ranging signal message from each of the one or more responder UEs comprises a time of arrival of the ranging signal and a time of departure of the responding ranging signal broadcast by each of the one or more responder UEs, and wherein determining the range to each of the one or more responder UEs uses the time of departure and the time of arrival of the ranging signal and the time of arrival and the time of departure of the responding post ranging signal message.

10. The method of claim 1, further comprising receiving a capability message from each of the one or more responder UEs before sending the initial message, wherein each capability message comprises an ID for a responder UE.

11. A user equipment (UE) configured to perform a ranging session between UEs, the UE being an initiating UE in the ranging session, the UE comprising:
  a wireless transceiver configured to wirelessly communicate with entities in a wireless network;
  at least one memory; and
  at least one processor coupled to the wireless transceiver and the at least one memory, wherein the at least one processor is configured to:

send an initial message to one or more responder UEs to initiate a ranging session, the initial message comprising an identifier (ID) for the initiating UE and an ID for each of the one or more responder UEs;

determine timing instances for messages in the ranging session from the initiating UE and each of the one or more responder UEs based on the ID for the initiating UE and the ID for each of the one or more responder UEs; and perform the ranging session with each of the one or more responder UEs using the determined timing instances for the messages in the ranging session.

12. The UE of claim 11, wherein the at least one processor is configured to determine the timing instances for the messages in the ranging session by being configured to use a multivariable deterministic function to determine the timing instances for the messages in the ranging session based on the ID for the initiating UE and the ID for each of the one or more responder UEs, wherein each of the one or more responder UEs use the multivariable deterministic function to determine the timing instances for the messages in the ranging session, and the timing instances for the messages in the ranging session are determined uniquely.

13. The UE of claim 11, wherein the at least one processor is configured to determine the timing instances for the messages in the ranging session further based on an order of the IDs for the initiating UE and each of the one or more responder UEs.

14. The UE of claim 11, wherein the at least one processor is further configured to determine ranging signal identifiers in the ranging session for the initiating UE and each of the one or more responder UEs based on the ID for the initiating UE and the ID for each of the one or more responder UEs.

15. The UE of claim 11, wherein the initial message further comprises an indication that the timing instances for the messages in the ranging session will be determined using a function using the ID for the initiating UE and the ID for each of the one or more responder UEs as inputs.

16. The UE of claim 11, wherein the initial message further comprises an indication of a channel for a ranging signal to be broadcast by the initiating UE.

17. The UE of claim 11, wherein the initial message does not include timing information for the ranging session.

18. The UE of claim 11, wherein the at least one processor is configured to perform the ranging session by being configured to:

receive an initial response message from each of the one or more responder UEs based on the determined timing instances;

broadcast a ranging signal;

receive a responding ranging signal broadcast by each of the one or more responder UEs;

send a post ranging signal message to each of the one or more responder UEs based on the determined timing instances;

receive a responding post ranging signal message from each of the one or more responder UEs based on the determined timing instances; and determine a range to each of the one or more responder UEs.

19. The UE of claim 18, where the post ranging signal message comprises a time of departure of the ranging signal and a time of arrival of the responding ranging signal received from each of the one or more responder UEs, and the responding post ranging signal message from each of the one or more responder UEs comprises a time of arrival of the ranging signal and a time of departure of the responding ranging signal broadcast by each of the one or more responder UEs, and wherein the at least one processor is configured to determine the range to each of the one or more responder UEs based on the time of departure and the time of arrival of the ranging signal and the time of arrival and the time of departure of the responding post ranging signal message.

20. The UE of claim 11, wherein the at least one processor is further configured to receive a capability message from each of the one or more responder UEs before the initial message is sent, wherein each capability message comprises an ID for a responder UE.

21. A user equipment (UE) configured to perform ranging between UEs, the UE being an initiating UE in the ranging session, the UE comprising:

means for sending an initial message to one or more responder UEs to initiate a ranging session, the initial message comprising an identifier (ID) for the initiating UE and an ID for each of the one or more responder UEs;

means for determining timing instances for messages in the ranging session from the initiating UE and each of the one or more responder UEs based on the ID for the initiating UE and the ID for each of the one or more responder UEs; and means for performing the ranging session with each of the one or more responder UEs using the determined timing instances for the messages in the ranging session.

22. A method of ranging between user equipments (UEs) performed by a responder UE, the method comprising:

receiving an initial message from an initiating UE to initiate a ranging session, the initial message comprising an identifier (ID) for the initiating UE and an ID for each of one or more responder UEs;

determining timing instances for messages in the ranging session from the initiating UE and each of the one or more responder UEs based on the ID for the initiating UE and the ID for each of the one or more responder UEs; and performing the ranging session with the initiating UE using the determined timing instances for the messages in the ranging session.

23. The method of claim 22, wherein determining the timing instances for the messages in the ranging session comprises using a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session, and the timing instances for the messages in the ranging session are determined uniquely.

24. The method of claim 22, wherein determining the timing instances for the messages in the ranging session is further based on an order of the IDs for the initiating UE and each of the one or more responder UEs.

25. The method of claim 22, further comprising determining ranging signal identifiers in the ranging session for the initiating UE and each of the one or more responder UEs based on the ID for the initiating UE and the ID for each of the one or more responder UEs.

26. The method of claim 22, wherein the initial message further comprises an indication that the timing instances for the messages in the ranging session will be determined using a function using the ID for the initiating UE and the ID for each of the one or more responder UEs as inputs.

27. The method of claim 22, wherein the initial message further comprises an indication of a channel for a ranging signal to be broadcast by the initiating UE.

28. The method of claim 22, wherein the initial message does not include timing information for the ranging session.

29. The method of claim 22, wherein performing the ranging session comprises:
   sending an initial response message to the initiating UE based on the determined timing instances;
   receiving a ranging signal broadcast by the initiating UE;
   broadcasting a responding ranging signal broadcast;
   receiving a post ranging signal message from the initiating UE based on the determined timing instances;
   sending a responding post ranging signal message to the initiating UE based on the determined timing instances; and
   determining a range to the initiating UE.

30. The method of claim 29, where the post ranging signal message received from the initiating UE comprises a time of departure of the ranging signal and a time of arrival of the responding ranging signal, and the responding post ranging signal message sent to the initiating UE comprises a time of arrival of the ranging signal and a time of departure of the responding ranging signal broadcast by each of the one or more responder UEs, and wherein determining the range to the initiating UE uses the time of departure and the time of arrival of the ranging signal and the time of arrival and the time of departure of the responding post ranging signal message.

31. The method of claim 22, further comprising broadcasting a capability message before receiving the initial message, wherein the capability message comprises an ID for the responder UE.

32. A user equipment (UE) configured to perform a ranging session between UEs, the UE being a responder UE in the ranging session, the UE comprising:
   a wireless transceiver configured to wirelessly communicate with entities in a wireless network;
   at least one memory; and
   at least one processor coupled to the wireless transceiver and the at least one memory, wherein the at least one processor is configured to:
   receive an initial message from an initiating UE to initiate a ranging session, the initial message comprising an identifier (ID) for the initiating UE and an ID for each of one or more responder UEs;
   determine timing instances for messages in the ranging session from the initiating UE and each of the one or more responder UEs based on the ID for the initiating UE and the ID for each of the one or more responder UEs; and
   perform the ranging session with the initiating UE using the determined timing instances for the messages in the ranging session.

33. The UE of claim 32, wherein the at least one processor is configured to determine the timing instances for the messages in the ranging session by being configured to use a multivariable deterministic function to determine the timing instances for the messages in the ranging session based on the ID for the initiating UE and the ID for each of the one or more responder UEs, wherein the initiating UE and each of the one or more responder UEs use the multivariable deterministic function to determine the timing instances for the messages in the ranging session, and the timing instances for the messages in the ranging session are determined uniquely.

34. The UE of claim 32, wherein the at least one processor is configured to determine the timing instances for the messages in the ranging session further based on an order of the IDs for the initiating UE and each of the one or more responder UEs.

35. The UE of claim 32, wherein the at least one processor is further configured to determine ranging signal identifiers in the ranging session for the initiating UE and each of the one or more responder UEs based on the ID for the initiating UE and the ID for each of the one or more responder UEs.

36. The UE of claim 32, wherein the initial message further comprises an indication that the timing instances for the messages in the ranging session will be determined using a function using the ID for the initiating UE and the ID for each of the one or more responder UEs as inputs.

37. The UE of claim 32, wherein the initial message further comprises an indication of a channel for a ranging signal to be broadcast by the initiating UE.

38. The UE of claim 32, wherein the initial message does not include timing information for the ranging session.

39. The UE of claim 32, wherein the at least one processor is configured to perform the ranging session by being configured to:
   send an initial response message to the initiating UE based on the determined timing instances;
   receive a ranging signal broadcast by the initiating UE;
   broadcast a responding ranging signal broadcast;
   receive a post ranging signal message from the initiating UE based on the determined timing instances;
   send a responding post ranging signal message to the initiating UE based on the determined timing instances; and
   determine a range to the initiating UE.

40. The UE of claim 39, where the post ranging signal message received from the initiating UE comprises a time of departure of the ranging signal and a time of arrival of the responding ranging signal, and the responding post ranging signal message sent to the initiating UE comprises a time of arrival of the ranging signal and a time of departure of the responding ranging signal broadcast by each of the one or more responder UEs, and wherein the at least one processor is configured to determine the range to the initiating UE based on the time of departure and the time of arrival of the ranging signal and the time of arrival and the time of departure of the responding post ranging signal message.

41. The UE of claim 32, wherein the at least one processor is further configured to broadcast a capability message before receiving the initial message, wherein the capability message comprises an ID for the responder UE.

42. A user equipment (UE) configured to perform a ranging session between UEs, the UE being a responder UE in the ranging session, the UE comprising:
   means for receiving an initial message from an initiating UE to initiate a ranging session, the initial message comprising an identifier (ID) for the initiating UE and an ID for each of one or more responder UEs;
   means for determining timing instances for messages in the ranging session from the initiating UE and each of the one or more responder UEs based on the ID for the initiating UE and the ID for each of the one or more responder UEs; and means for performing the ranging session with the initiating UE using the determined timing instances for the messages in the ranging session.

\* \* \* \* \*